(12) United States Patent
Hong et al.

(10) Patent No.: US 10,716,443 B2
(45) Date of Patent: Jul. 21, 2020

(54) ROBOT CLEANER

(71) Applicant: Samsung Electronics Co., Ltd., Suwon-si (KR)

(72) Inventors: Seok Man Hong, Suwon-si (KR); Dong Wook Kim, Suwon-si (KR); Sin Ae Kim, Suwon-si (KR); Ki Hwan Kwon, Hwaseong-si (KR); Sung Jin Park, Suwon-si (KR); Hyo Won Sin, Anseong-si (KR); Jin Wook Yoon, Yongin-si (KR); Dong Woo Ha, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 15/579,477

(22) PCT Filed: Jun. 1, 2016

(86) PCT No.: PCT/KR2016/004949
§ 371 (c)(1),
(2) Date: Dec. 4, 2017

(87) PCT Pub. No.: WO2016/195266
PCT Pub. Date: Dec. 8, 2016

(65) Prior Publication Data
US 2018/0213987 A1     Aug. 2, 2018

(30) Foreign Application Priority Data

Jun. 3, 2015   (KR) .................. 10-2015-0078328

(51) Int. Cl.
*A47L 9/02*     (2006.01)
*A47L 9/28*     (2006.01)
(Continued)

(52) U.S. Cl.
CPC ............. *A47L 9/0494* (2013.01); *A47L 9/009* (2013.01); *A47L 9/02* (2013.01); *A47L 9/28* (2013.01);
(Continued)

(58) Field of Classification Search
CPC ............... A47L 9/02; A47L 9/28; A47L 11/00
See application file for complete search history.

(56) References Cited

U.S. PATENT DOCUMENTS

| 2008/0086837 | A1 | 4/2008 | Son et al. |
| 2011/0239397 | A1 | 10/2011 | Dekkers et al. |
| 2015/0059120 | A1* | 3/2015 | Riehl ...................... A47L 9/009 15/340.3 |

FOREIGN PATENT DOCUMENTS

| CN | 202599824 | 12/2012 |
| CN | 104414585 | 3/2015 |

(Continued)

OTHER PUBLICATIONS

Extended European Search Report dated May 24, 2018 in European Patent Application No. 16803621.8.
(Continued)

*Primary Examiner* — Michael D Jennings
(74) *Attorney, Agent, or Firm* — Staas & Halsey LLP

(57) ABSTRACT

The robotic cleaner includes a cleaner body that is movable and a suction unit that is movable relative to the cleaner body in a vertical direction. The suction unit includes an inlet for sucking impurities from the surface to be cleaned, and at least one support unit for spacing the inlet and the surface to be cleaned. With the configuration, the foreign substance suction efficiency from the surface to be cleaned may be improved, and a constant gap between the suction portion and the surface to be cleaned may be maintained.

15 Claims, 25 Drawing Sheets

(51) Int. Cl.
*A47L 9/04* (2006.01)
*B25J 11/00* (2006.01)
*A47L 9/00* (2006.01)

(52) U.S. Cl.
CPC .......... *A47L 9/2826* (2013.01); *A47L 9/2852* (2013.01); *B25J 11/00* (2013.01); *A47L 2201/00* (2013.01); *A47L 2201/04* (2013.01); *A47L 2201/06* (2013.01)

(56) References Cited

FOREIGN PATENT DOCUMENTS

| DE | 202004002284 | 8/2004 |
|---|---|---|
| EP | 1827193 | 9/2007 |
| KR | 2000-0000942 | 1/2000 |
| KR | 10-2006-0063195 | 6/2006 |
| KR | 10-0624386 | 9/2006 |
| KR | 10-2007-0032838 | 3/2007 |
| KR | 10-2007-0052367 | 5/2007 |
| KR | 10-0747137 | 8/2007 |

OTHER PUBLICATIONS

International Search Report dated Sep. 21, 2016 in corresponding International Patent Application No. PCT/KR2016/004949.
Written Opinion of the International Searching Authority dated Sep. 21, 2016 in corresponding International Patent Application No. PCT/KR2016/004949.
Chinese Office Action dated Nov. 4, 2019 in Chinese Patent Application No. 201680045411.X.
Australian Office Action dated Apr. 14, 2020 in Australian Patent Application No. 2016273463.

* cited by examiner

[Fig. 1]
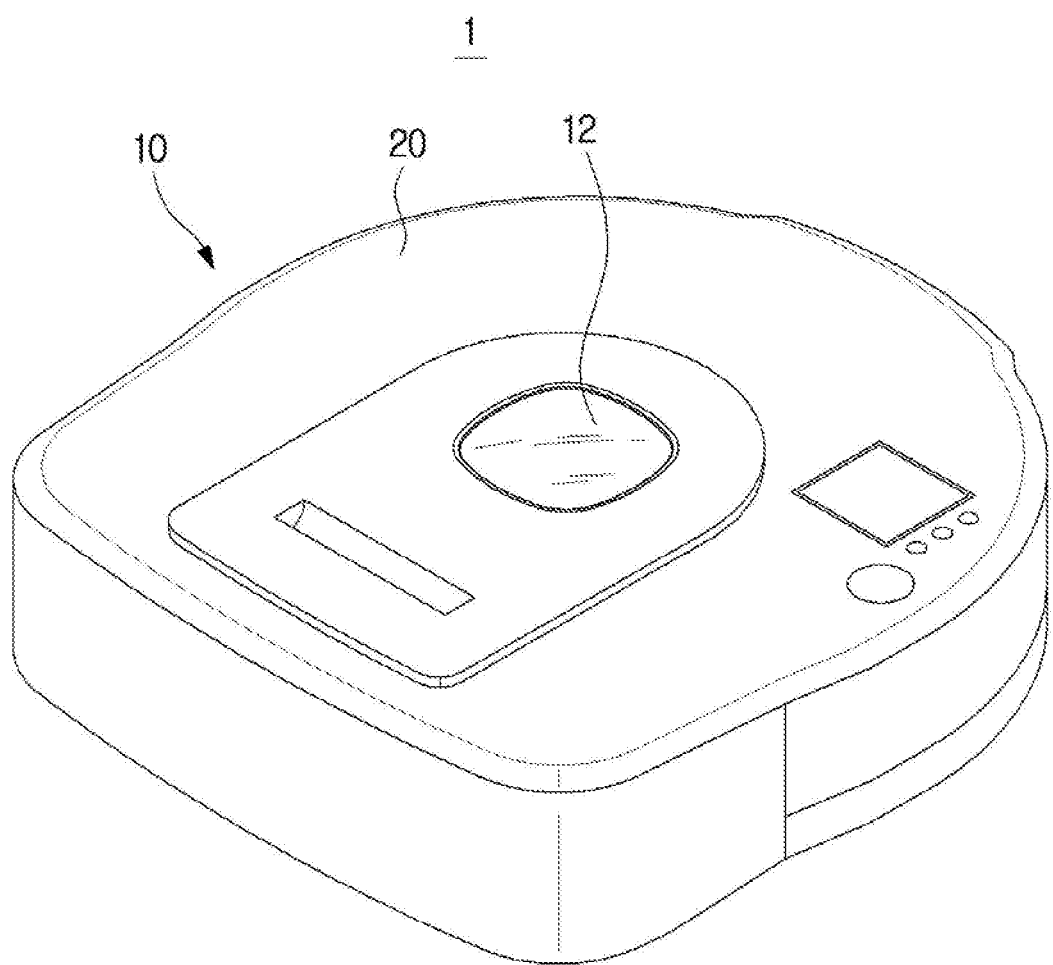

[Fig. 2]
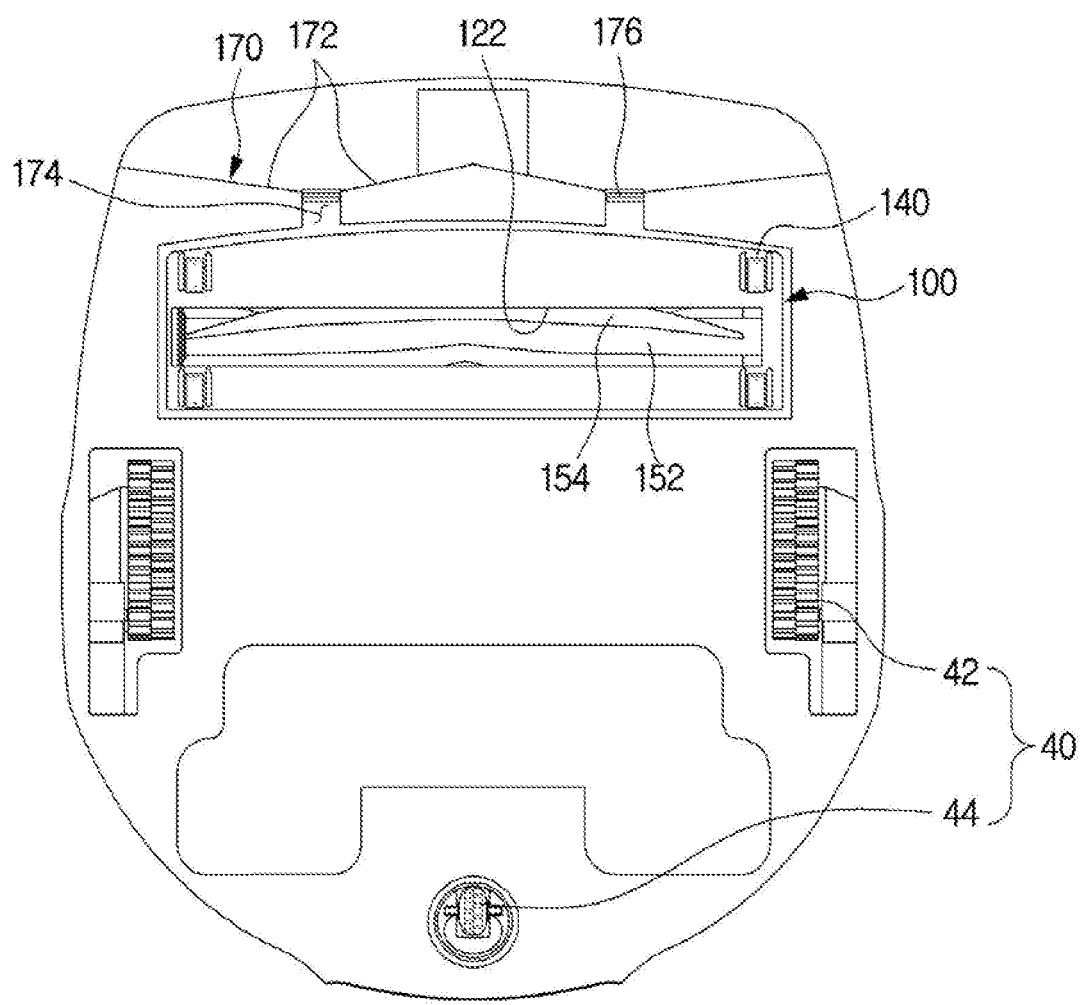

[Fig. 3]
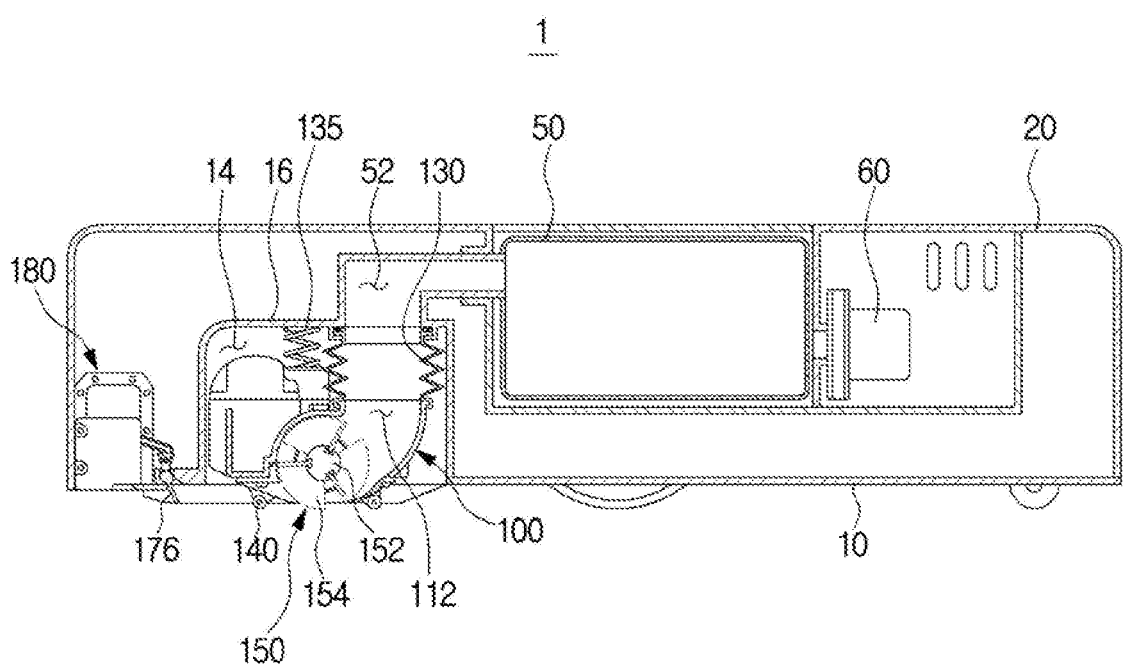

[Fig. 4]
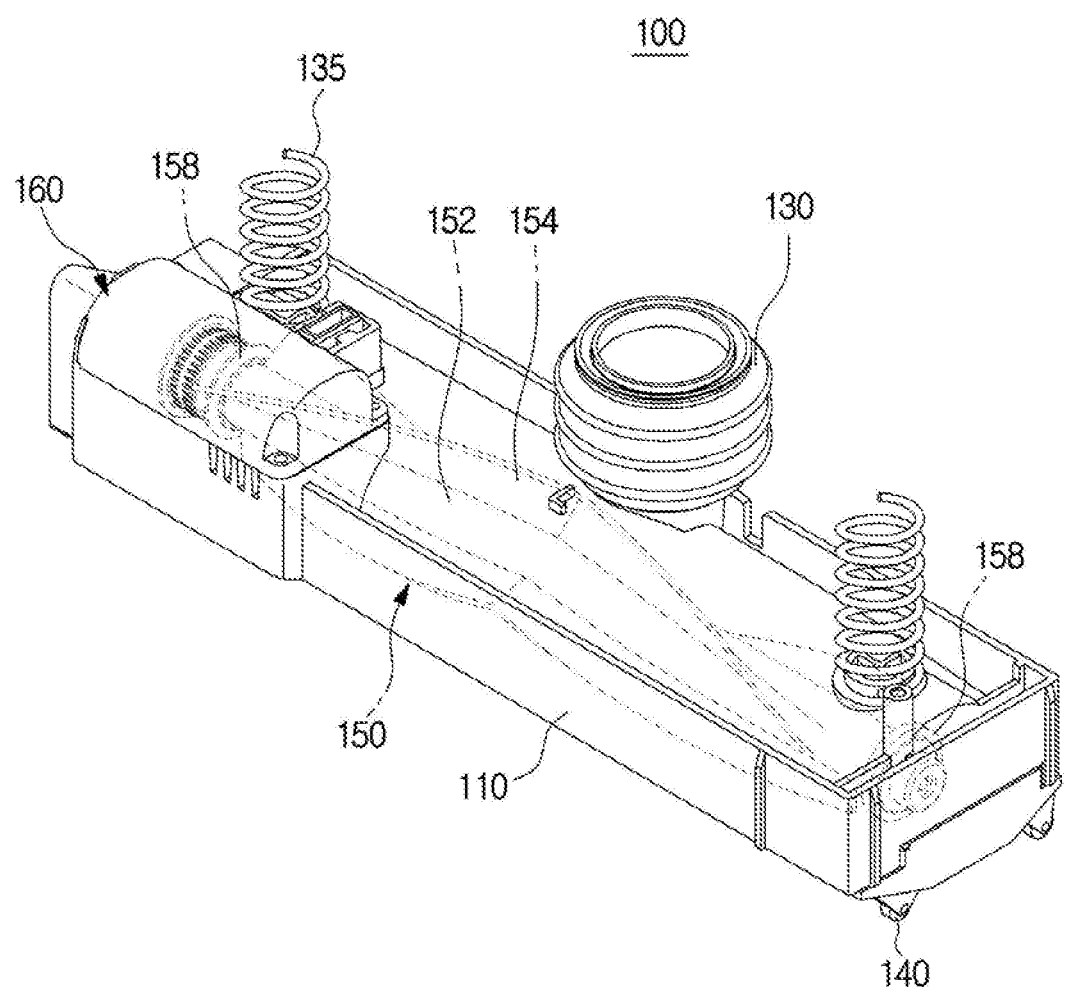

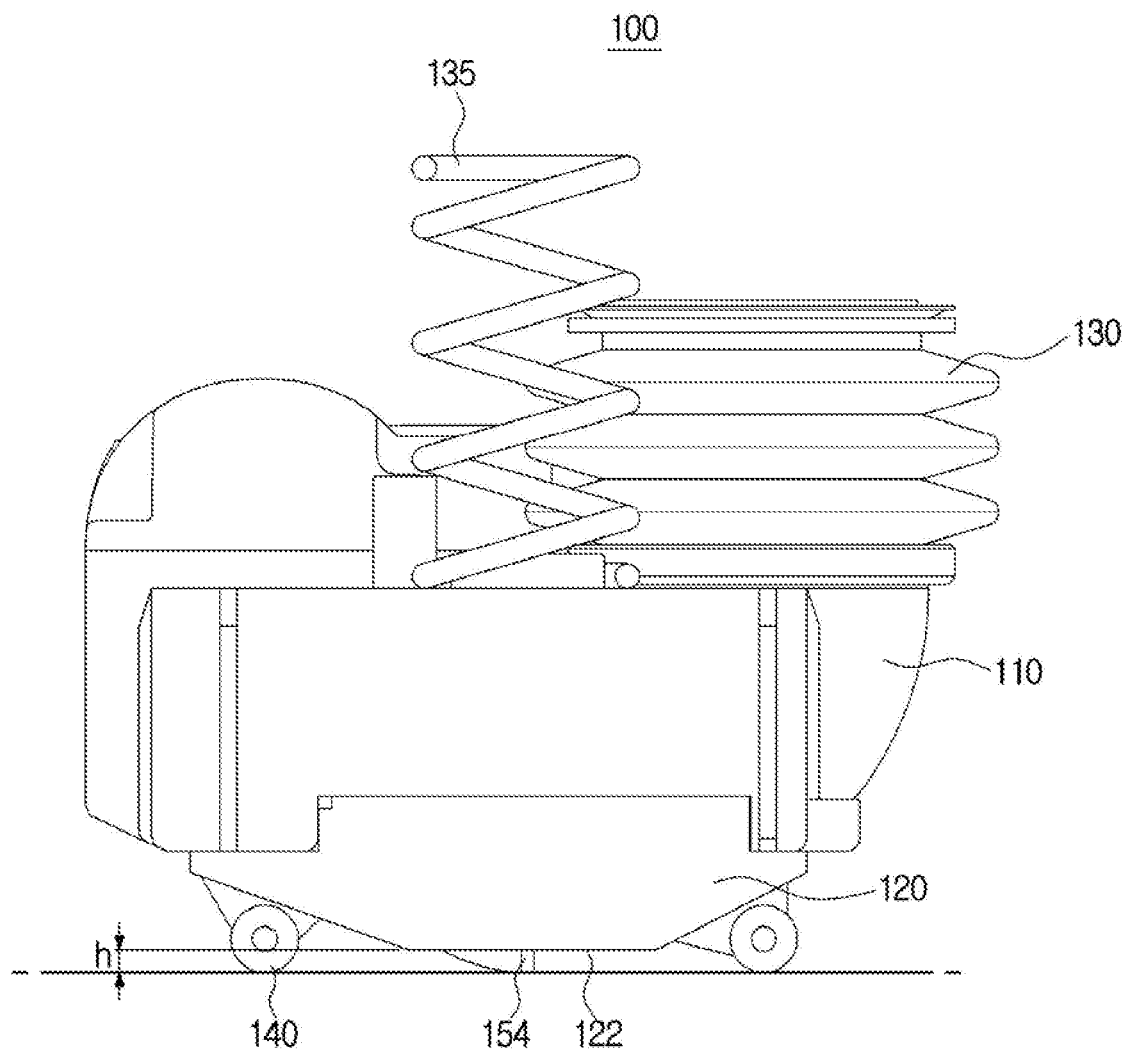
[Fig. 5]

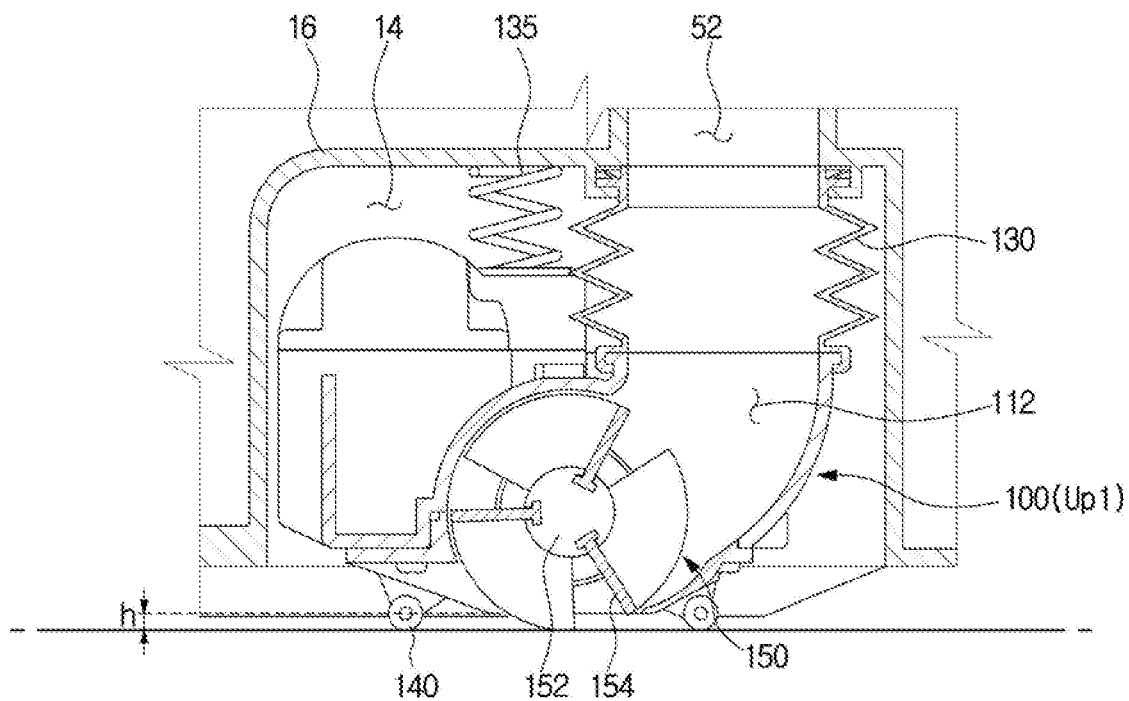
[Fig. 6]

[Fig. 7]
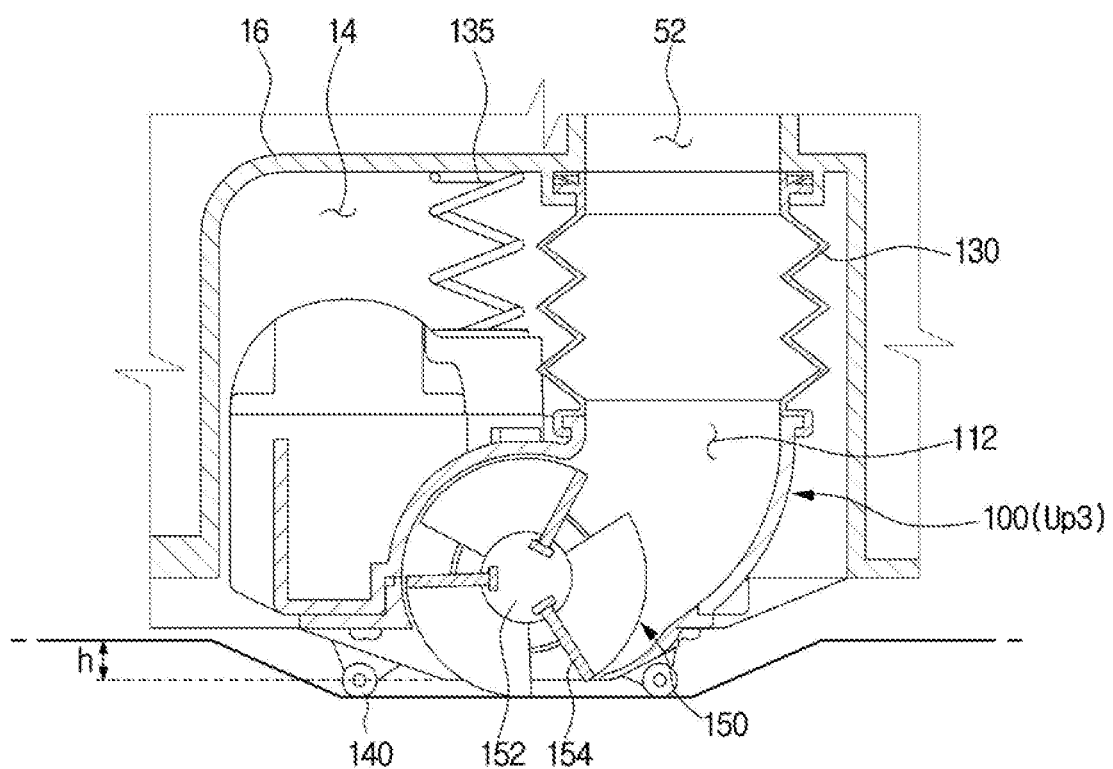

[Fig. 8]
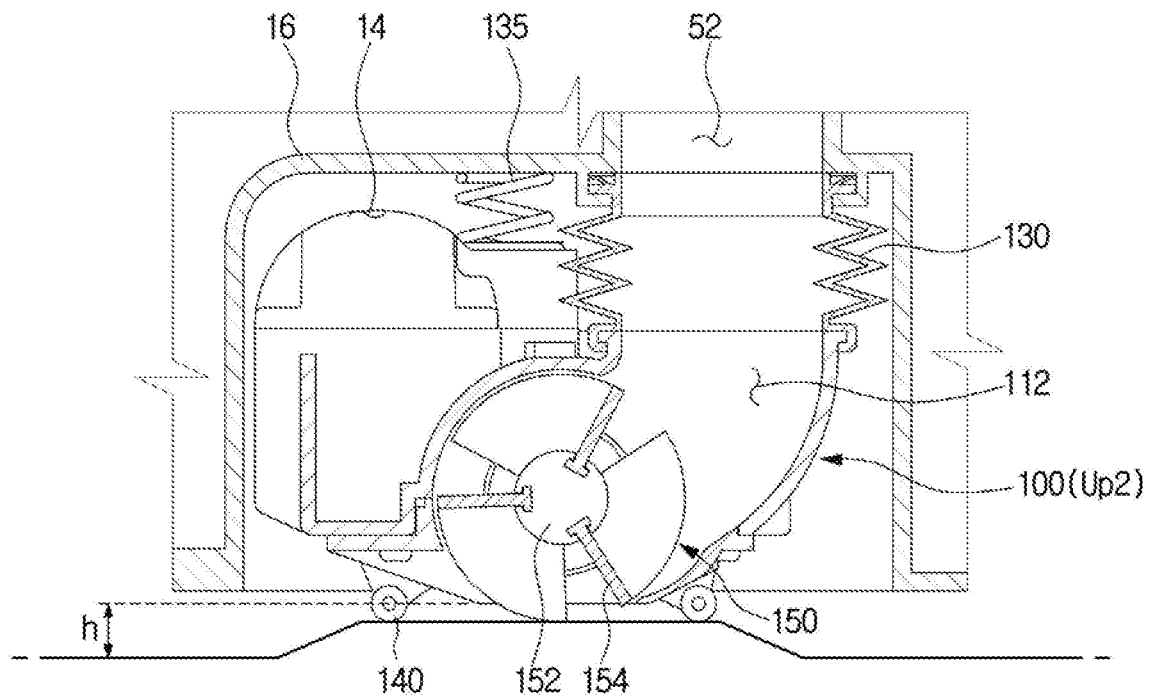

[Fig. 9]
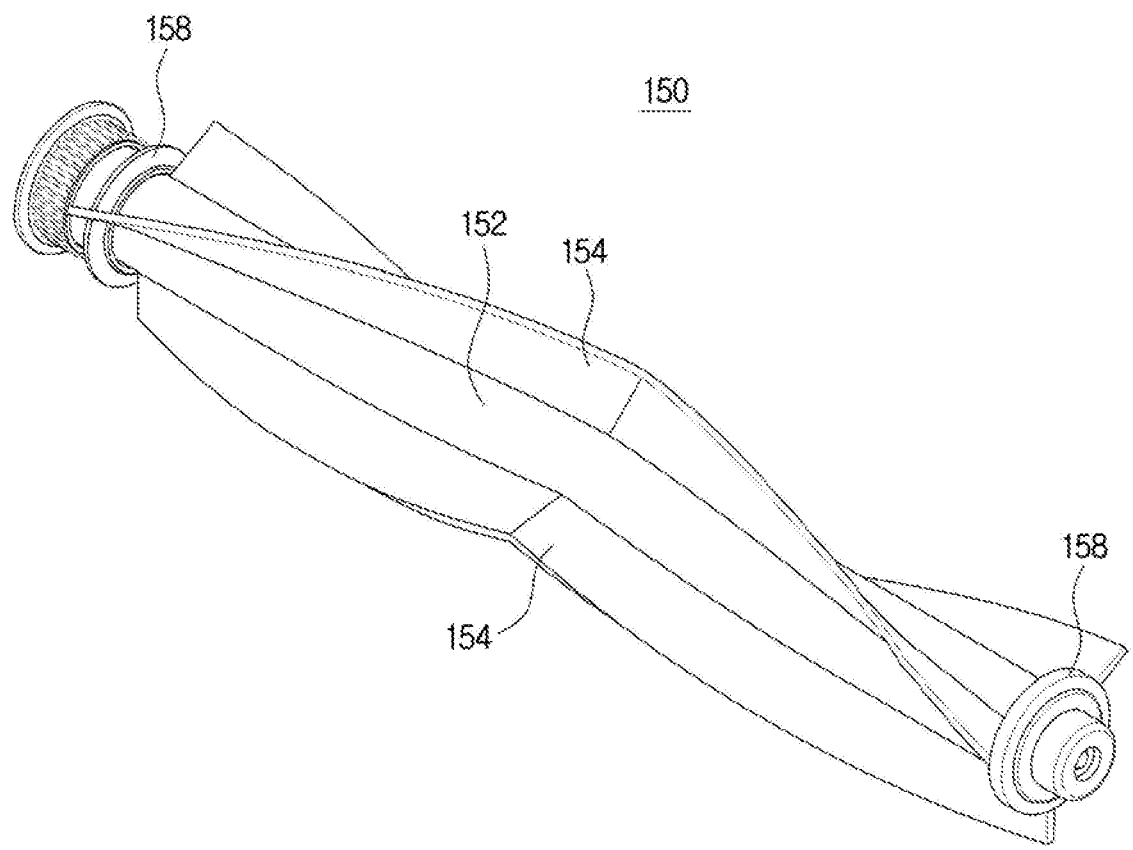

[Fig. 10]
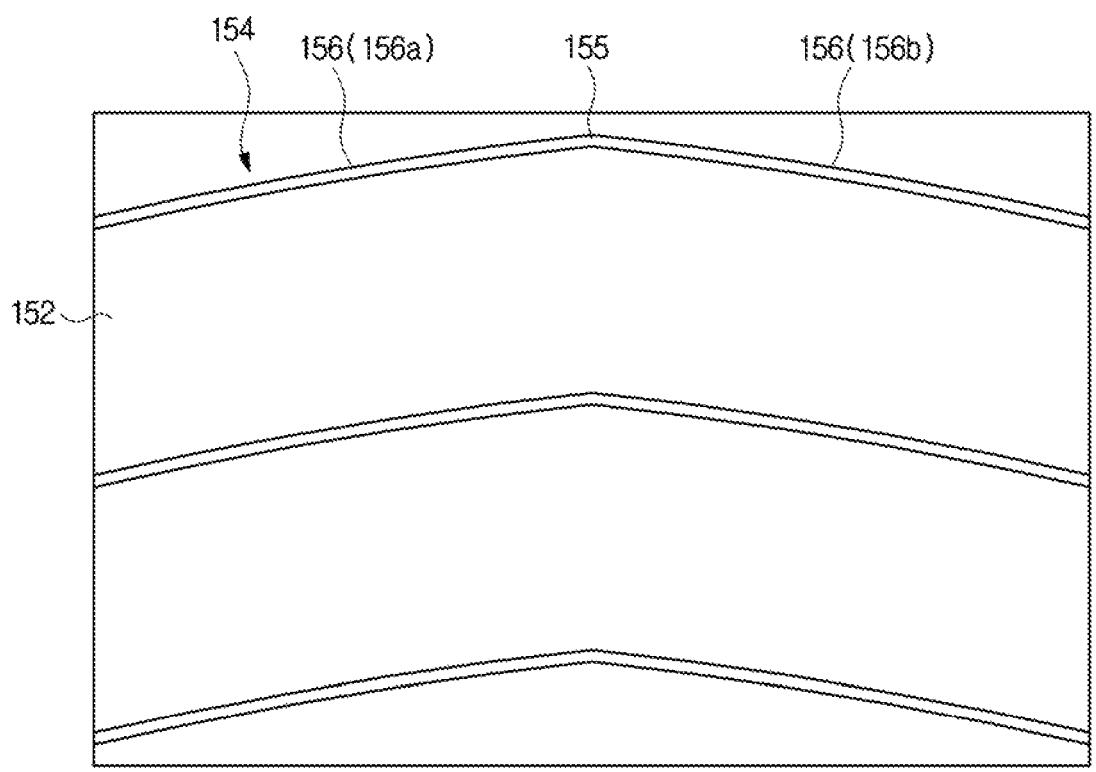

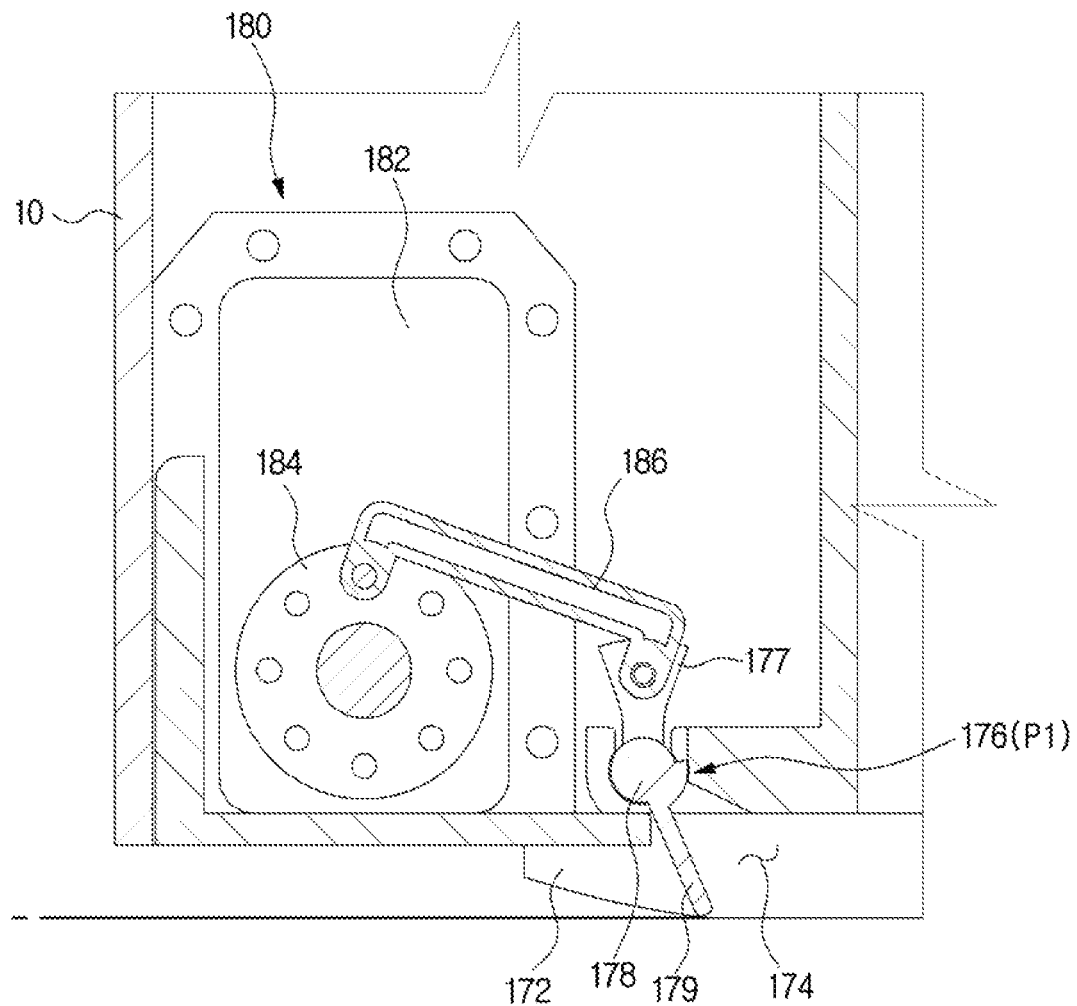
[Fig. 11]

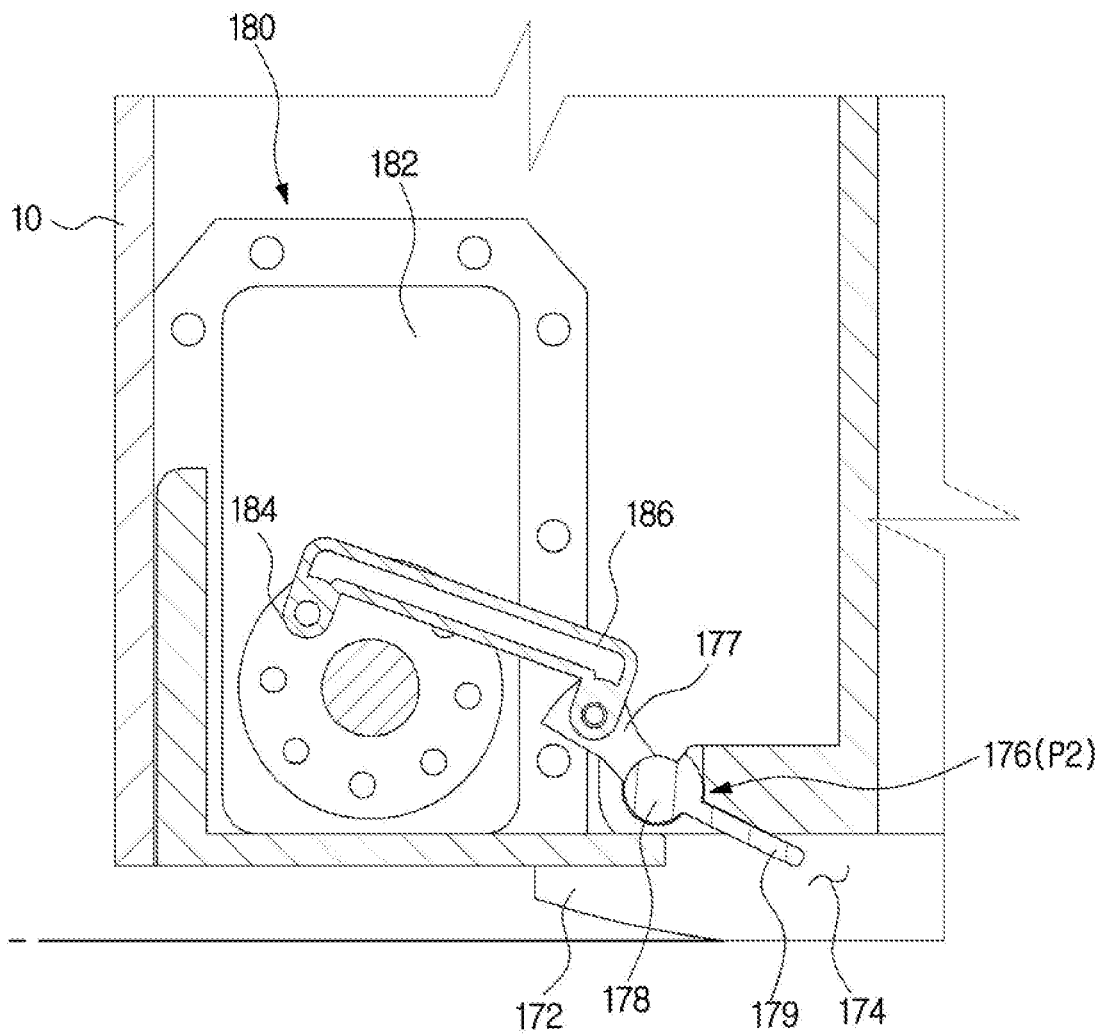
[Fig. 12]

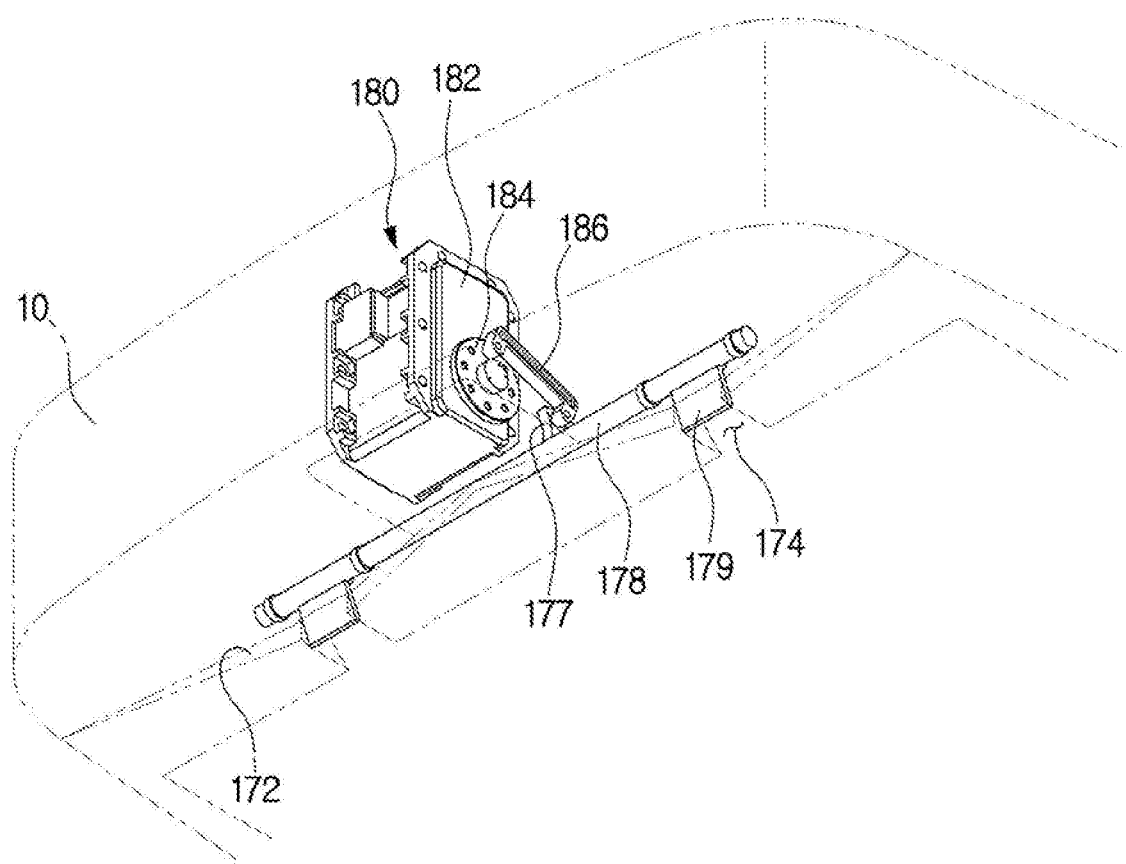
[Fig. 13]

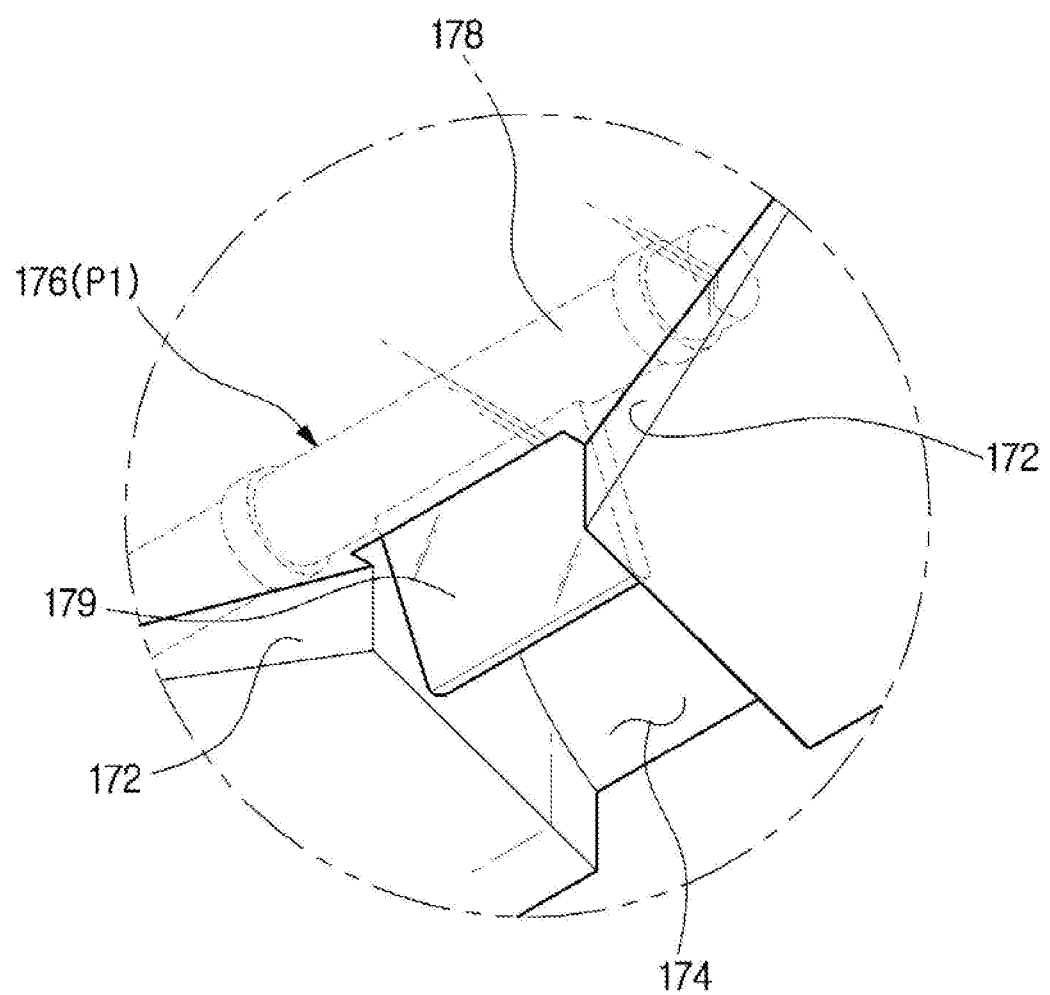
【Fig. 14】

[Fig. 15]
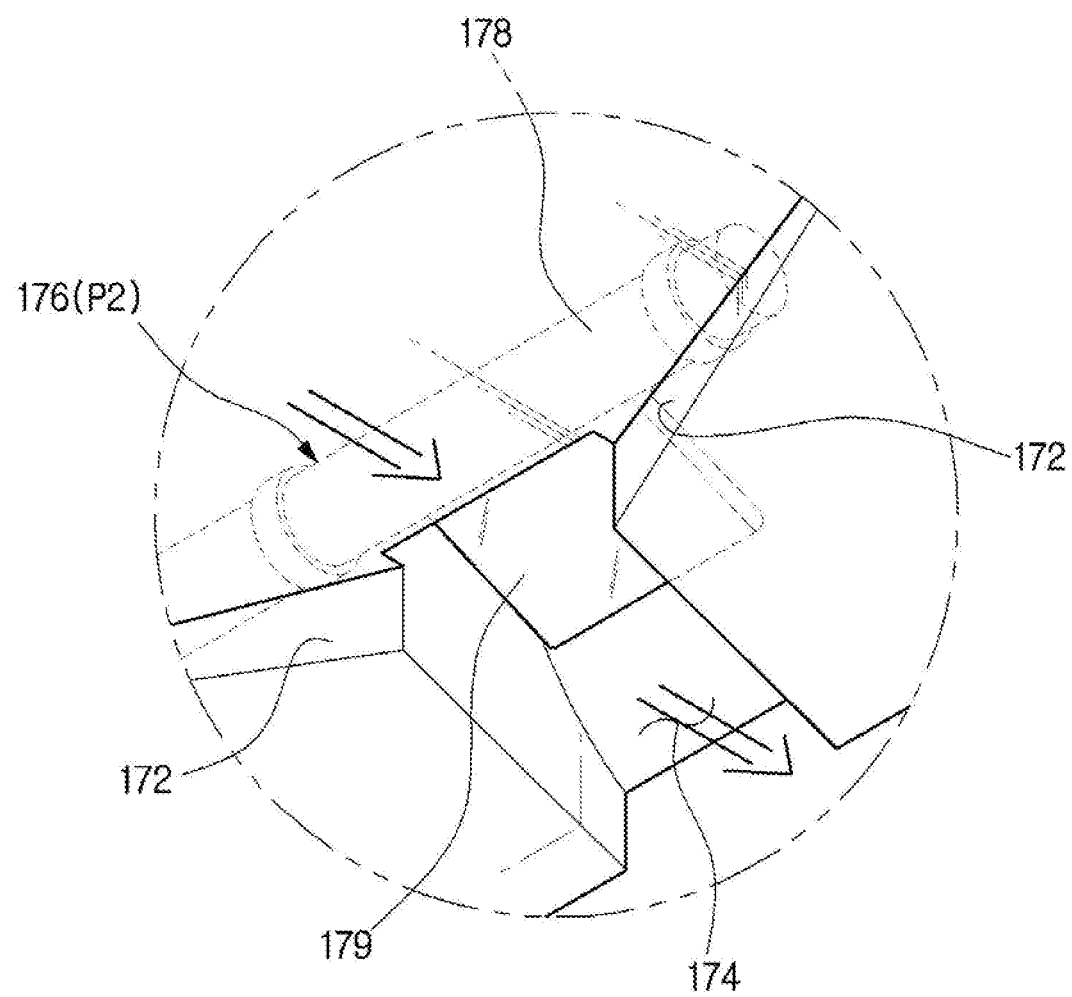

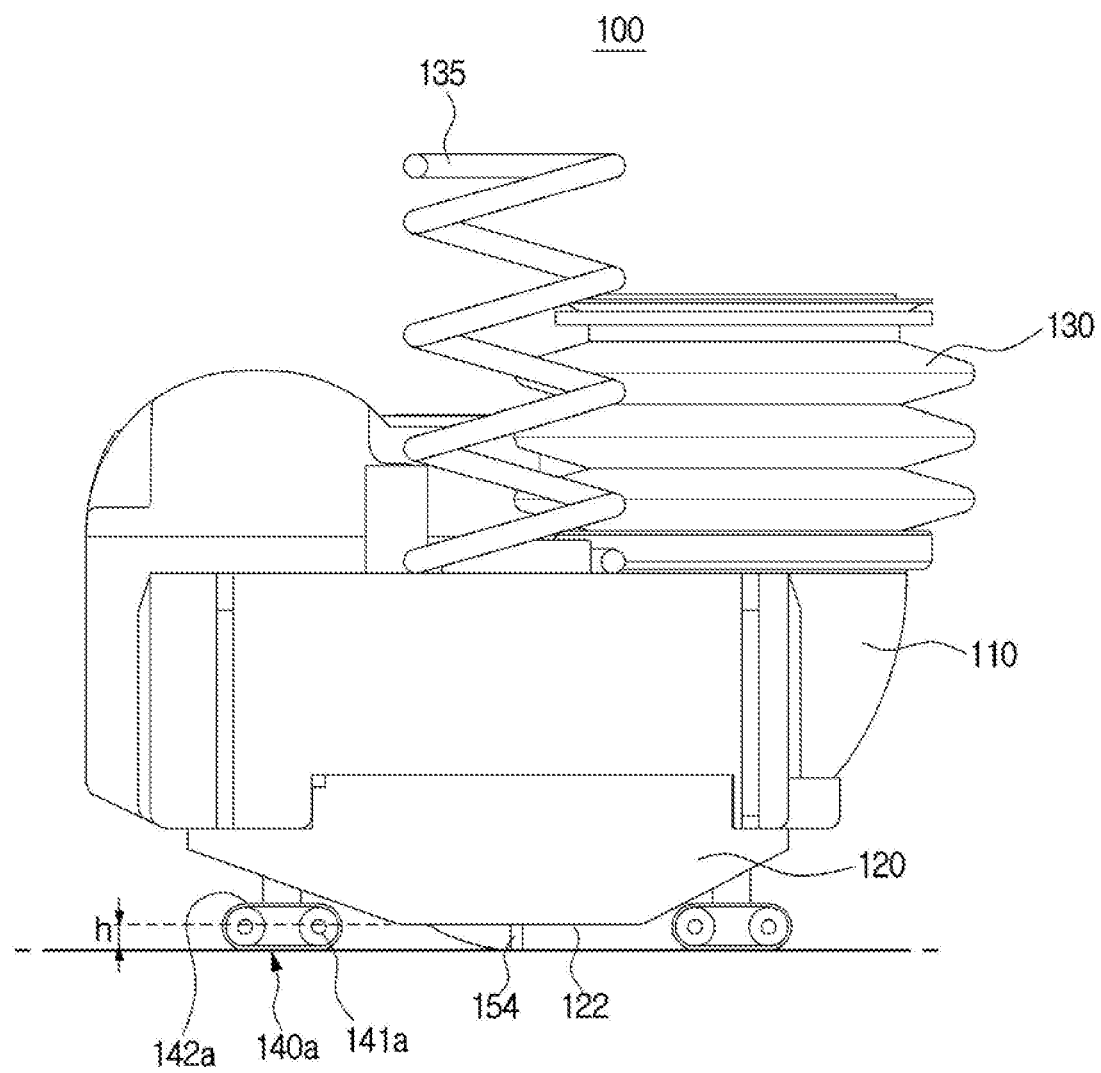
[Fig. 16]

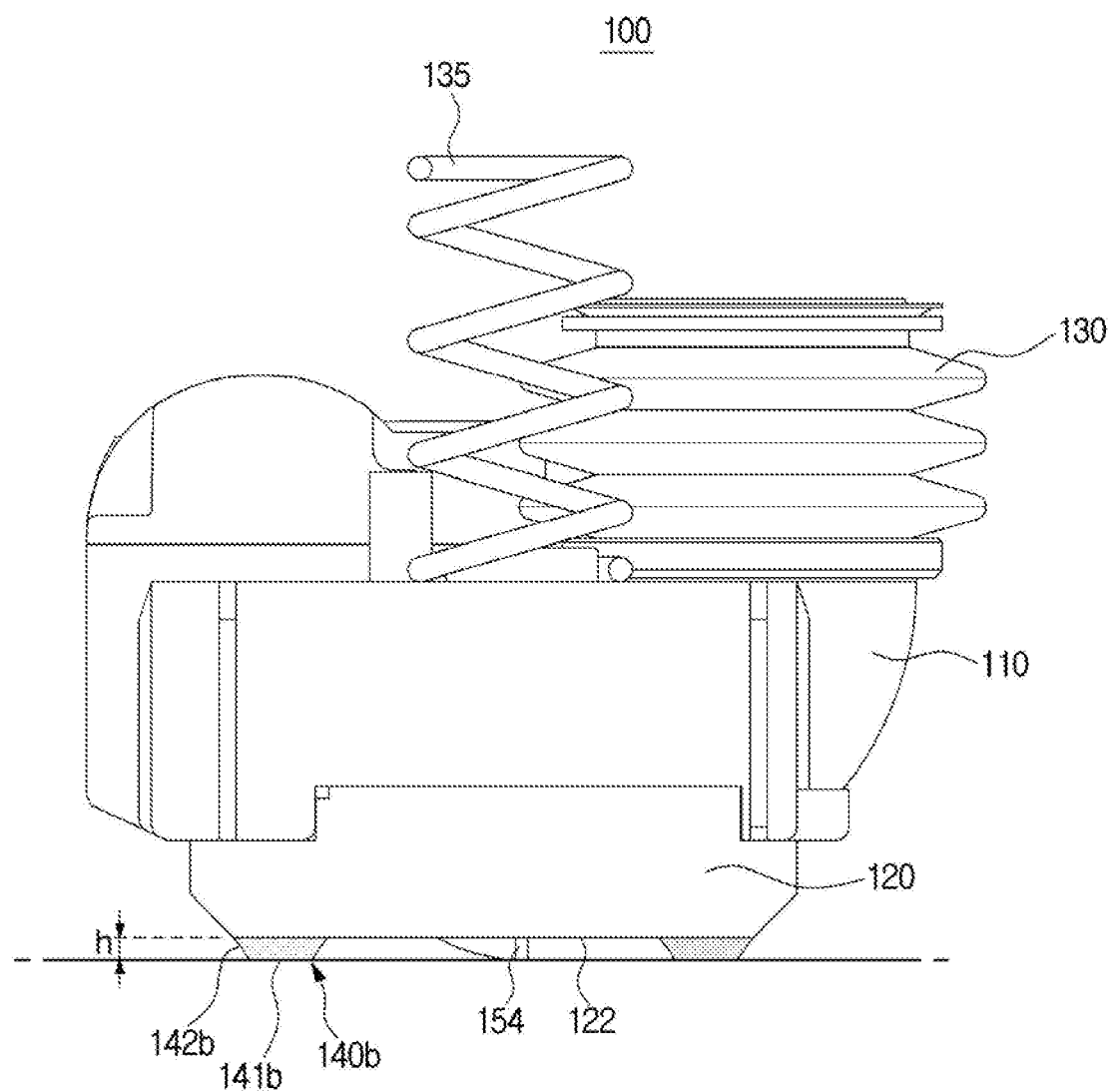
[Fig. 17]

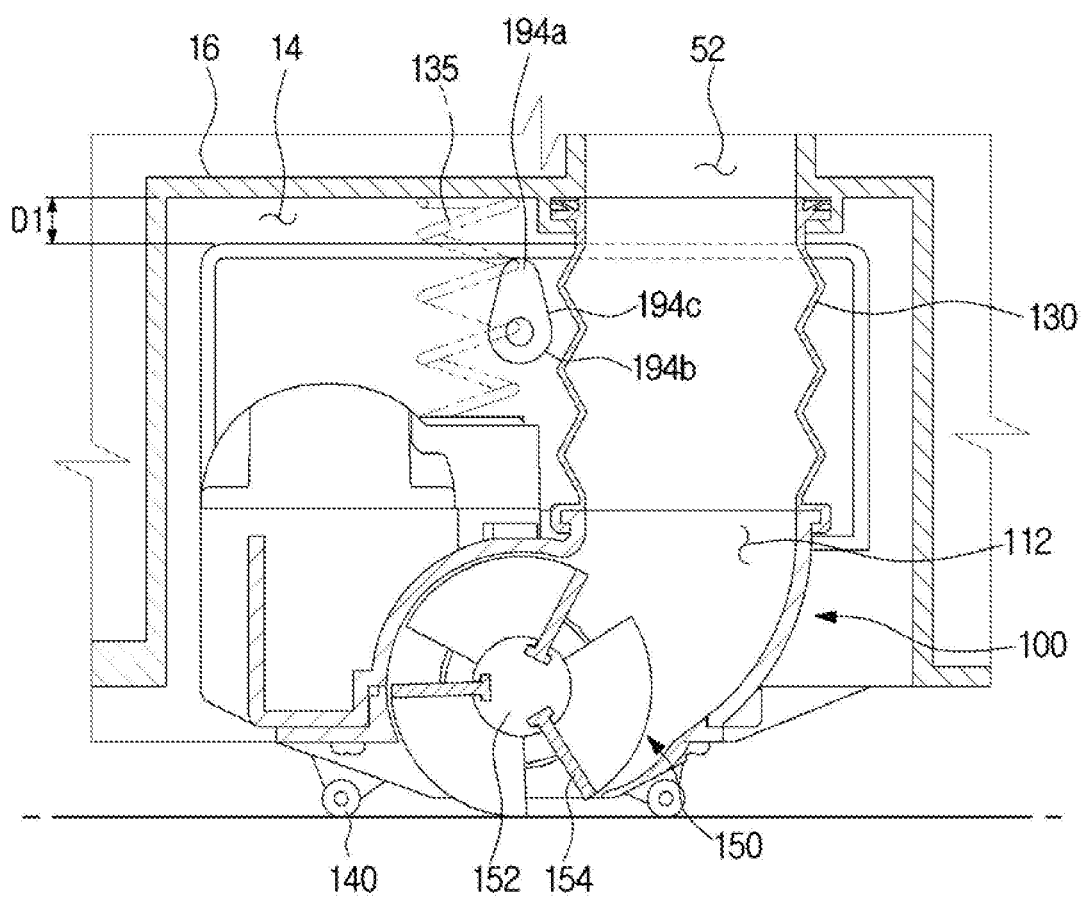
[Fig. 18]

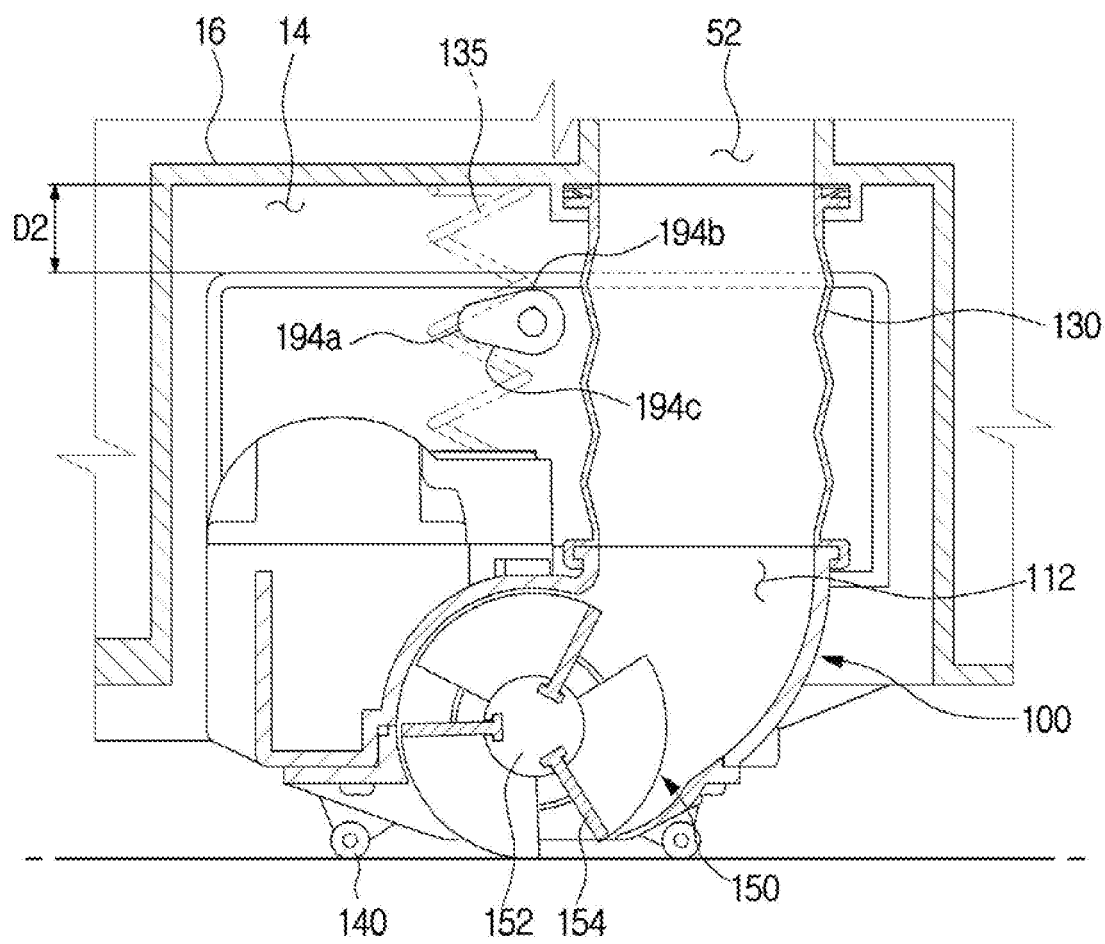
[Fig. 19]

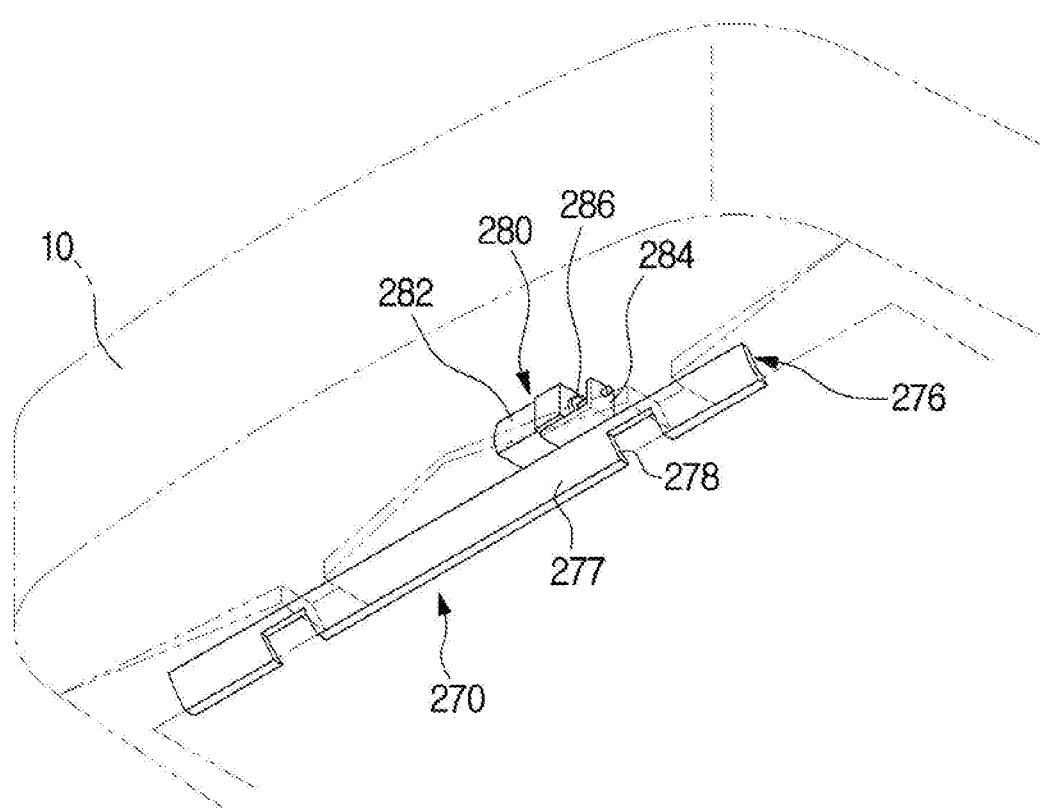
[Fig. 20]

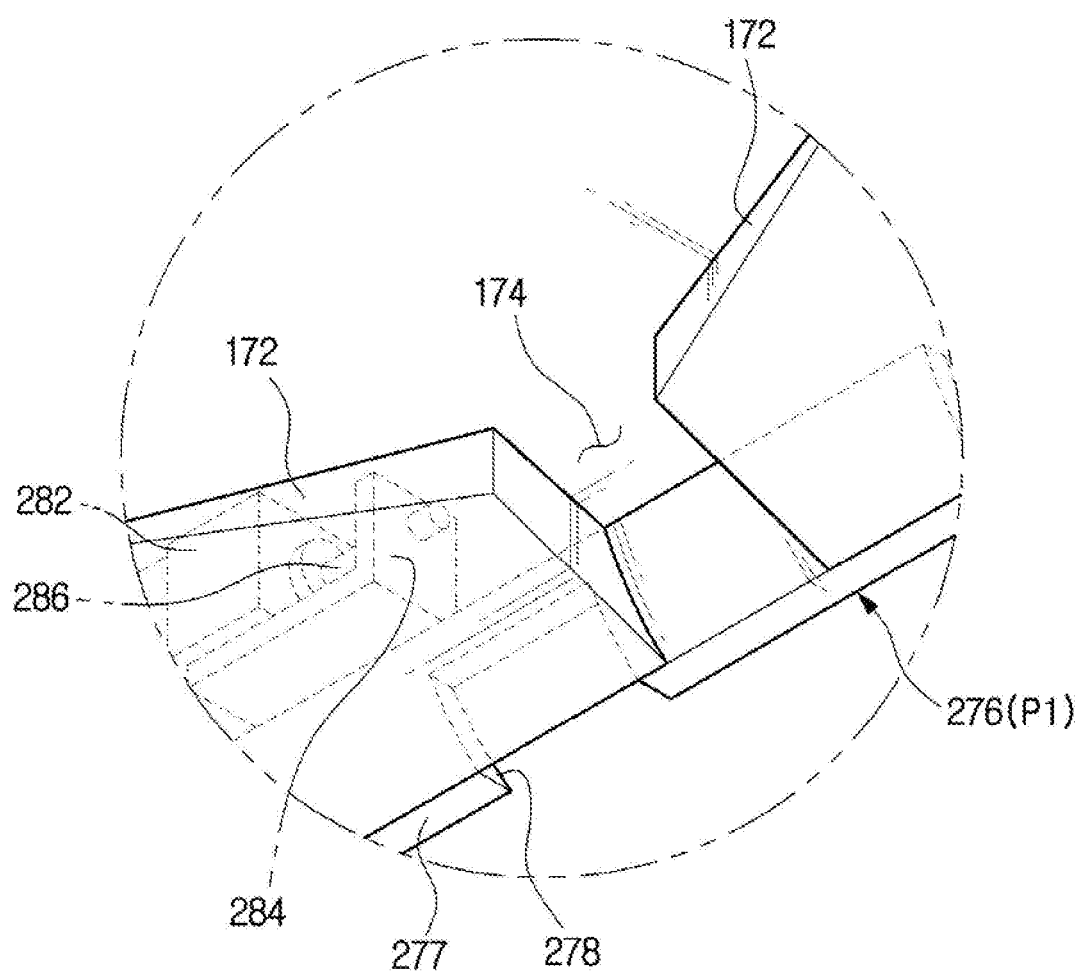
[Fig. 21]

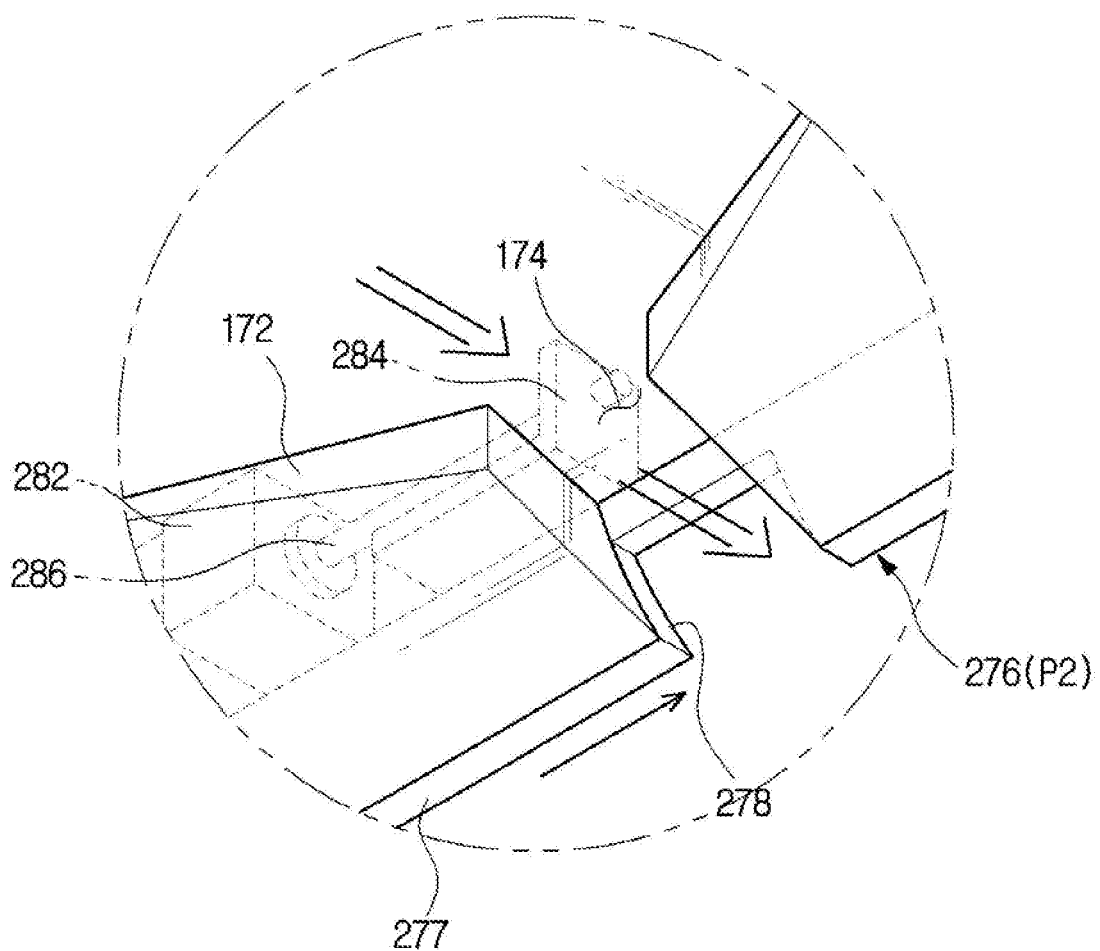
[Fig. 22]

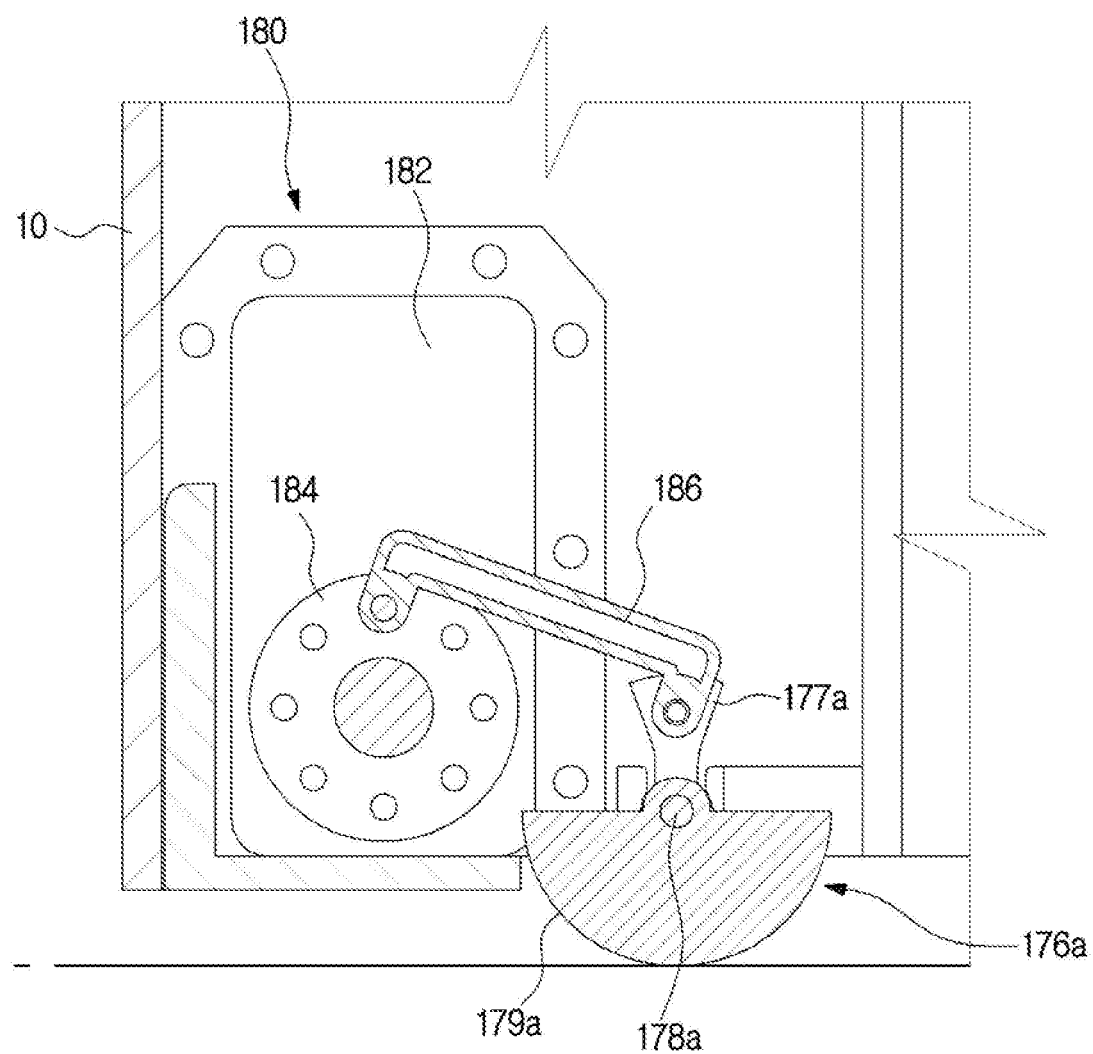
[Fig. 23]

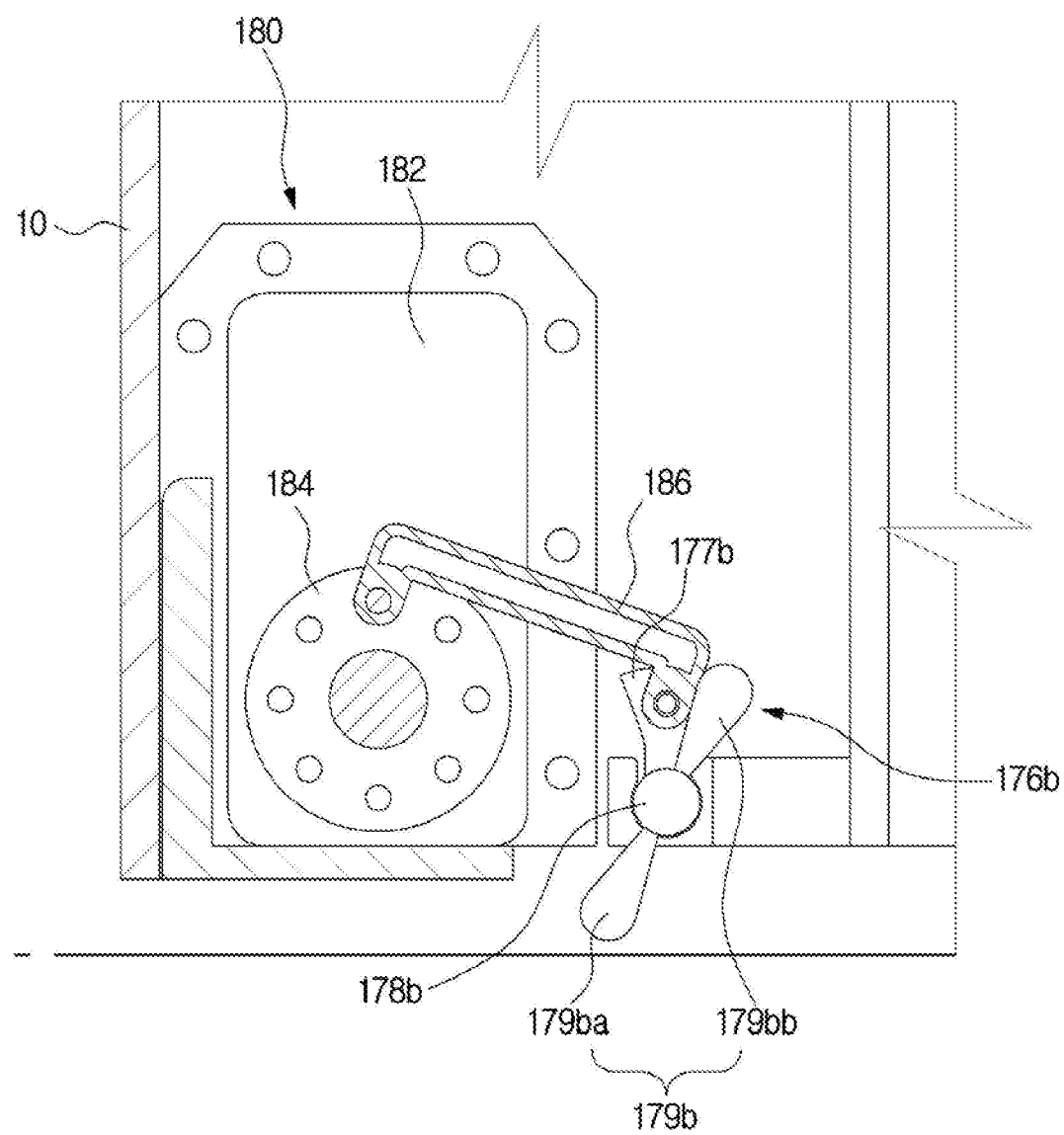
[Fig. 24]

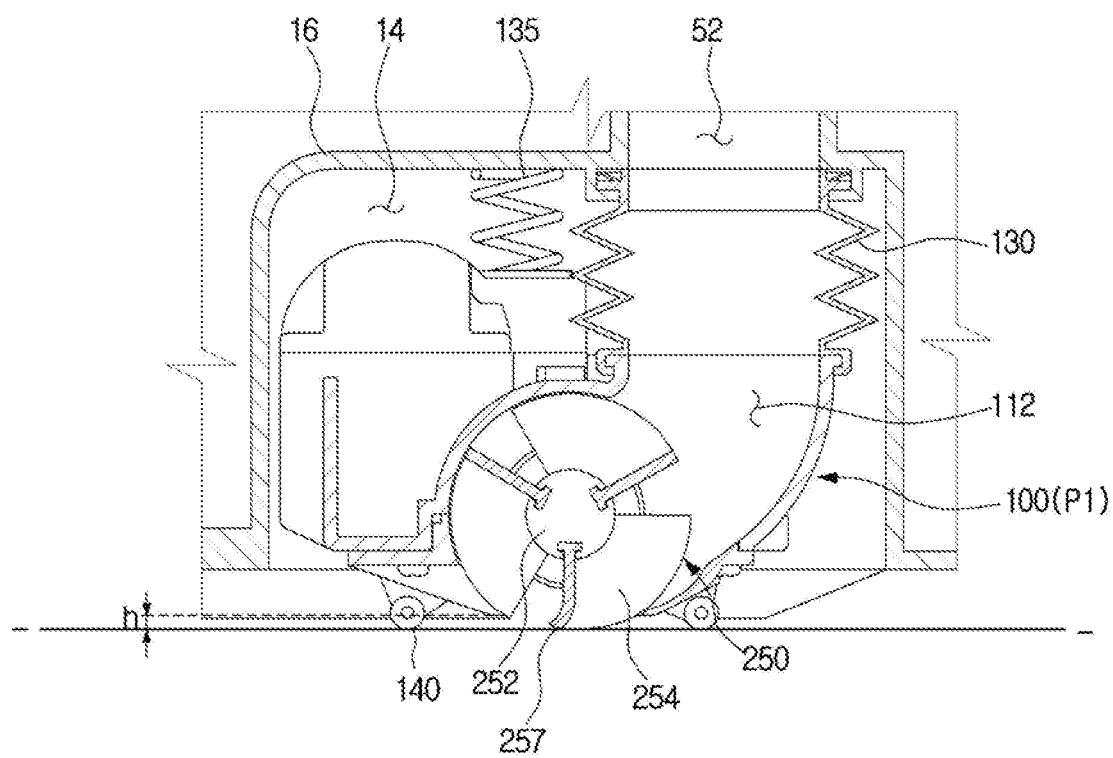
[Fig. 25]

ROBOT CLEANER

CROSS-REFERENCE TO RELATED APPLICATIONS

This application is a U.S. National Stage Application which claims the benefit under 35 U.S.C. § 371 of International Patent Application No. PCT/KR2016/004949, filed on Jun. 1, 2016, which claims the foreign priority benefit under 35 U.S.C. § 119 of Korean Patent Application No. 10-2015-0078328 filed Jun. 3, 2015, the contents of which are incorporated herein by reference.

TECHNICAL FIELD

The present invention relates to a robotic cleaner with improved cleaning efficiency.

BACKGROUND ART

The robotic cleaner is a device that performs cleaning by suctioning foreign matter such as dust from the floor while moving around the cleaning area by itself without user's manipulation. The robotic cleaner identifies the distances to obstacles such as furniture, office supplies, and walls installed in the cleaning area through a distance sensor, and cleans the cleaning area while changing directions by selectively rotating a motor of the robotic cleaner.

The robotic cleaner has a suction portion on the bottom and sucks dust from the bottom surface through a suction portion. On the suction portion side, a brush is rotatably provided to pick up dust from the floor surface.

However, with the conventional robotic cleaner, the cleaning efficiency is lowered because cleaning is performed in the same manner even though the surface to be cleaned of each cleaning section has a different condition while in the cleaning process.

DISCLOSURE

Technical Problem

One aspect of the invention provides a robotic cleaner that improves the structure to be changed in respond to the state of a surface to be cleaned.

Another aspect of the present invention provides a robotic cleaner that improves the structure to maintain suction force at an inlet through which the foreign matter comes in. Another aspect of the present invention provides a robotic cleaner that changes its structure to guide a foreign object in response to the condition of a surface to be cleaned. Another aspect of the present invention provides a robotic cleaner that improves a foreign matter pickup efficiency.

Technical Solution

In accordance with one aspect of the present disclosure, a robotic cleaner includes a cleaner body arranged to be movable; and a suction unit arranged to move relative to the cleaner body in a vertical direction. The suction unit includes an inlet, through which foreign matter on the cleaning surface is sucked; and at least one support unit provided to separate the inlet and the cleaning surface from each other by a predetermined distance.

The suction unit is configured to move relative to the surface to be cleaned according to a condition of the surface to be cleaned.

The suction unit comprises a suction unit body, and a suction portion for forming the inlet under the suction unit body. The at least one support unit supports the suction unit body such that the suction portion is positioned higher than the surface to be cleaned.

The at least one support unit is rotatably provided at the bottom of the suction unit body to support the suction unit body against the surface to be cleaned.

The at least one support unit includes a plurality of rollers, and a moving belt configured to surround the plurality of rollers and configured to be rotated with the plurality of rollers in contact with the surface to be cleaned.

The at least one support unit includes a supporting surface contacting with the surface to be cleaned; and a bending supporting surface bent obliquely upward from the supporting surface.

The at least one support unit is disposed around the inlet.

The suction unit includes a suction unit body, a suction portion forming the inlet under the suction unit body; and a brush unit arranged to be rotated about a rotation axis within the suction unit body. The brush unit is formed to have rotation radius larger than a gap between the rotation shaft and the suction portion.

The brush unit includes a bending portion which is at least part of the brush unit formed to be bendable to sweep the surface to be cleaned.

The brush unit includes a rotating drum rotating about the rotation axis; and a brush formed on an outer circumferential surface of the rotating drum. The brush includes a converging portion; and at least one blade portion formed from the converging portion toward the end of the rotating drum along the rotation direction.

The at least one blade portion includes a first blade and a second blade, which are branched from the converging portion toward either end of the rotating drum. The first blade and the second blade are arranged spirally along the rotation direction of the brush unit from the converging portion.

The at least one blade portion has a V-shape around the converging portion.

The at least one blade portion includes a plurality of blade portions spaced apart at regular intervals along an outer circumferential surface of the rotating drum.

The cleaner body includes a moving space, in which the suction unit is arranged to move relative to the cleaner body in a vertical direction. The suction unit includes a suction unit body disposed in the moving space; and an elastic unit member having one end connected to the suction unit body and the other end connected to the cleaner body for the suction unit body to be moved inside the moving space.

The suction unit includes a control frame provided on the suction unit body, a control cam for adjusting a height of the suction unit relative to the cleaner body to limit a movement range of the suction unit within the moving space, and contacting the control frame to change the position of the control frame according to the rotation angle.

Advantageous Effects

The robotic cleaner of the present invention improves a foreign matter suction efficiency by providing a suction portion for sucking foreign matter to make relative movement to the main body of the cleaner in response to a state of the surface to be cleaned.

Also, it may improve the suction efficiency in the suction portion by keeping a constant gap between the suction portion and the surface to be cleaned.

Also, according to the state of the surface to be cleaned, it may change the structure of a suction guide for guiding foreign materials to the suction portion to improve the foreign matter suction efficiency.

In addition, it may improve the structure to pick up foreign matters in the suction portion, so that the foreign matter may be easily sucked.

DESCRIPTION OF DRAWINGS

FIG. 1 is a perspective view of a robotic cleaner according to an embodiment of the present invention;

FIG. 2 is a bottom view of a robotic cleaner according to an embodiment of the present invention;

FIG. 3 is a cross-sectional view of a robotic cleaner in accordance with an embodiment of the present invention;

FIG. 4 is a perspective view of a suction unit according to an embodiment of the present invention;

FIG. 5 is a side view of a suction unit according to an embodiment of the present invention;

FIGS. 6, 7, and 8 are diagrams illustrating operations of a suction unit according to a state of a surface to be cleaned according to an embodiment of the present invention;

FIG. 9 is a perspective view of a brush unit according to an embodiment of the present invention;

FIG. 10 is a development figure of a brush unit according to an embodiment of the present invention;

FIGS. 11 and 12 are diagrams illustrating opening and closing operations of an opening or closing unit according to an embodiment of the present invention;

FIG. 13 is a bottom perspective view of an opening or closing unit according to an embodiment of the present invention;

FIGS. 14 and 15 are enlarged views of an operation of an opening or closing unit according to an embodiment of the present invention;

FIG. 16 is a side view of a suction unit according to another embodiment of the present invention;

FIG. 17 is a side view of a suction unit according to another embodiment of the present invention;

FIGS. 18 and 19 are cross-sectional views of a suction unit according to another embodiment of the present invention;

FIG. 20 is a bottom perspective view of an opening or closing unit according to another embodiment of the present invention;

FIGS. 21 and 22 are enlarged views of an operation of an opening or closing unit according to another embodiment of the present invention;

FIG. 23 is a view of an opening or closing unit according to another embodiment of the present invention;

FIG. 24 is a view of an opening or closing unit according to another embodiment of the present invention; and FIG. 25 is a view of a brush unit according to another embodiment of the present invention.

BEST MODE

The embodiments described in this specification and configurations illustrated in drawings are only exemplary embodiments and do not represent the overall technological scope of the disclosure, and it is to be understood that the disclosure covers various equivalents, modifications, and substitutions at the time of filing of this application.

Also, throughout the entire specification, the same reference numerals refer to the same components or elements to serve the same function.

Also, the terminology used herein is for the purpose of describing particular embodiments only and is not intended to be limiting of the present disclosure. Also, as used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, it will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present disclosure, and similarly, a first element could be also termed a second element. The term "and/or" includes any and all combinations of one or more of the associated, listed items.

Hereinafter, embodiments of the present disclosure will be described more fully with reference to the accompanying drawings.

FIG. 1 is a perspective view of a robotic cleaner according to an embodiment of the present invention, FIG. 2 is a bottom view of a robotic cleaner according to an embodiment of the present invention, and FIG. 3 is a cross-sectional view of a robotic cleaner according to an embodiment of the present invention.

A robotic cleaner 1 includes a cleaner body 10 forming an outer appearance, a cover 20 covering an upper portion of the cleaner body 10, a suction unit 100 for sweeping, scattering, or sucking foreign substances present on the surface to be cleaned, a power supply 30 for supplying driving power to drive the cleaner body 10, and a drive unit 40 for driving the cleaner body 10.

The cleaner body 10 forms an outer appearance of the robotic cleaner 1 and is provided to support various components installed therein. The cleaner body 10 may have a cylindrical shape. When the cylindrical cleaner body 10 is rotated, the rotation radius is constant, which makes it avoid contact with surrounding obstacles and makes it easy to change directions. In addition, it may prevent the cleaner body 10 from being stuck by an obstacle while moving around.

A display unit 12 may be provided on the upper surface of the cleaner body 10. The display unit 12 may be configured to display various information such as an operation state of the robotic cleaner 1, an amount of dust, an amount of battery charge, and time.

The robotic cleaner 1 may further include a sensor unit (not shown). The sensor unit may detect surrounding terrain, recognize a location of the robotic cleaner 1, and detect obstacles. Accordingly, the sensor unit may include a plurality of sensors. The plurality of sensors may be provided at different positions in the cleaner body 10.

The drive unit 40 may be configured to move the robotic cleaner. The drive unit 40 may include a drive wheel 42 provided on the bottom surface of the cleaner body 10. A plurality of drive wheels 42 may be provided. The drive wheels 42 may be arranged symmetrically on the left and right edges of a central region of the bottom surface of the cleaner body 10. The drive wheel 42 may be configured for the robotic cleaner 1 to move forward, move backward, and turn around during the cleaning. The drive wheel 42 may be driven by a motor.

The drive unit 40 may further include a caster 44. The caster 44 may be provided in front of or behind the drive wheel 42 at the bottom of the cleaner body 10. The caster 44 may be able to travel in all directions. The caster 44 may be configured for the robotic cleaner 1 to make smooth changes in direction.

The power supply 30 is electrically connected to the drive unit 40, the brush motor 160 to be described later, and other components for driving the cleaner body 10 to supply electricity. The power supply 30 includes a battery and may be configured to allow the cleaner body 10 to receive power from a docking station (not shown) when the cleaner completes cleaning operation and is coupled to the docking station.

The suction unit 100 may be disposed to face the surface to be cleaned for sucking foreign matter from the surface to be cleaned. The suction unit 100 includes a brush unit 150. The brush unit 150 is rotatably provided to sweep or scatter or pick up foreign substances present on the surface to be cleaned to the inside of the suction unit 100. The suction unit 100 will be described in detail later.

The robotic cleaner 1 may include a collecting member 50 and a suction motor 60.

The collecting member 50 is provided inside the cleaner body (10) to form space for collecting foreign substances sucked from the outside. The suction motor 60 is provided in the cleaner body 10 to generate a suction force to suck foreign substances on the surface to be cleaned through the suction unit 100, making the foreign substances collected into the collecting member 50.

FIG. 4 is a perspective view of a suction unit according to an embodiment of the present invention, and FIG. 5 is a side view of a suction unit according to an embodiment of the present invention.

The suction unit 100 may be provided on the bottom surface of the cleaner body 10 of the robotic cleaner 1. The suction unit 100 may remove foreign matter from the cleaning area by sucking the foreign matter with air.

The suction unit 100 may be provided to be movable relative to the cleaner body 10. In detail, the suction unit 100 may be provided to be movable up and down relative to the cleaner body 10. By doing this, the suction unit 100 may change a gap with the surface to be cleaned based on a curved state of the surface to be cleaned and a surface condition of the surface to be cleaned.

The suction unit 100 may include a suction unit body 110 and a suction portion 120.

The suction unit body 110 may be disposed in moving space 14 provided in the cleaner body 10 and able to move within the moving space 14. That is, the suction unit 100 may be arranged to make a relative movement to the cleaner body 10 in the vertical direction in the moving space 14.

A flexible pipe 130 may be connected to one side of the suction unit body 110 and linked with the collecting member 50 of the cleaner body 10. Since the suction unit 100 is relatively movable in the vertical direction with respect to the cleaner body 10 by the user's control or according to a condition of the surface to be cleaned, the flexible pipe 130 connects between the cleaner body 10 and the the suction unit body 110 with a variable distance between them. One end of the flexible pipe 130 is connected to the suction unit body 110 and the other end of the flexible pipe 130 is connected to the cleaner body 10 to be linked with the collecting member 50.

The suction unit 100 may include a elastic unit member 135 connecting the suction unit body 110 and the cleaner body 10 so that the suction unit body 110 may be relatively moved with respect to the cleaner body 10. At least one elastic unit member 135 may be provided in the suction unit 100 so that the suction unit 100 is elastically supported against the cleaner body 10. In this embodiment, since the suction unit 100 is disposed in the left-right direction with respect to a traveling direction of the robotic cleaner 1, a plurality of elastic unit members 135 may be arranged to be spaced on the top of the suction unit body 110. The cleaner body 10 may be provided with a unit moving part 16 forming the moving space 14. One end of the elastic unit member 135 is connected to the suction unit body 110 and the other end is connected to the unit moving part 16 so that the suction unit body 110 elastically moves within the moving space 14.

A suction portion 120 is provided on one side of the suction unit body 110 and is arranged to face the surface to be cleaned so as to suck foreign substances from the surface to be cleaned. The suction portion 120 has an inlet 122 formed therein and forces foreign matter to come into the collecting member 50 inside the cleaner body 10 through the inlet 122 and the suction unit 100.

The suction unit 100 may include at least one support unit 140.

The support unit 140 is provided to separate the inlet 122 and the surface to be cleaned by a predetermined distance h. When the inlet 122 and the surface to be cleaned are in close contact with each other, it makes it difficult for outside air and foreign matter to flow into the suction unit 100 through the inlet 122. Accordingly, in order to prevent lowering of the suction efficiency due to close contact between the inlet 122 and the surface to be cleaned, the support unit 140a supports the suction portion 120 so that the inlet 122 is spaced apart from the surface to be cleaned by the predetermined distance h.

The support unit 140 is provided to support the suction unit body 110 such that the suction portion 120 is positioned higher than the surface to be cleaned. At least one support unit 140 may be provided along the circumference of the suction portion 120. The support unit 140 is rotatably provided at a lower portion of the suction unit body 110 to support the suction unit body 110 such that the suction portion 120 and the surface to be cleaned are spaced apart from each other by the predetermined distance h.

In this embodiment, the support unit 140 is formed in the shape of a roller, and a plurality of suction units 120 are arranged along the circumference of the suction portion 120 such that the suction portions 120 are spaced apart from the surface to be cleaned by the predetermined distance h. As the support unit 140 has the roller shape, the suction unit 100 may be configured to move along the traveling direction of the robotic cleaner 1. [However, the shape and arrangement of the support unit 140 are not limited thereto, and it is satisfactory for the suction unit 120 to be configured to support the suction unit 100 by separating the inlet 122 of the suction unit 120 from the surface to be cleaned.

The suction unit 100 may include a brush unit 150.

The brush unit 150 is rotatably provided inside the suction unit 100 to pick up foreign substances from the surface to be cleaned into the suction unit 100. The brush unit 150 rotates around a rotation axis and is rotatable inside the suction unit body 110.

The brush unit 150 includes a rotating drum 152 rotating around a rotation axis and a brush 154 formed on the outer circumferential surface of the rotating drum 152. The brush unit (150) is driven by a brush motor 160. End caps 158 are provided at both ends of the rotating drum 152 to prevent foreign matter from moving to the brush motor 160. The brush 154 may be formed of an elastic material. While the robotic cleaner 1 is running, the brush 154 may be driven together with the rotating drum 152 to scatter or pick up dust or foreign matter present on the surface to be cleaned to the inside of the suction unit 100.

The brush 154 of the brush unit 150 is arranged with its end protruding further than the suction portion 120 to contact the surface to be cleaned. While the suction portion 120 is spaced the predetermined distance h apart from the surface to be cleaned by the support unit 140, the brush unit 150 may be arranged such that the brush 154 contacts the surface to be cleaned during the operation. In other words, the rotation radius of the brush unit 150 about the rotation axis may be larger than the distance between the rotation axis of the brush unit 150 and the suction portion 120. With this configuration, the brush unit 150 may not be disturbed by the suction portion 120 while sweeping, scattering, or picking up foreign matter from the surface to be cleaned into the suction unit 100.

The brush unit 150 will be described in detail later.

Operation of the suction unit 100 while the robotic cleaner 1 is running will now be described.

FIGS. 6, 7, and 8 are diagrams illustrating operations of a suction unit according to a condition of a surface to be cleaned according to an embodiment of the present invention. For convenience of explanation, when the robotic cleaner 1 moves on a flat surface, the position of the suction unit 100 is defined as the first position.

First, a case in which the robotic cleaner (1) travels on a convex surface to be cleaned is described. In this case, the suction unit 100 moves up from the first position to a second.

Next, a case where the robotic cleaner 1 travels on a concave surface to be cleaned is described. In this case, the suction unit 100 moves down to a third position from the first position.

Even while the suction unit 100 moves along the first position, the second position, and the third position, a support unit 140 provided at a lower portion of the suction unit 100 supports the suction unit 100 to maintain a constant gap between the surface to be cleaned and the suction portion 120. For convenience of explanation, the second position is taken as an example for a convex surface to be cleaned, and the third position for a concave surface to be cleaned, but the present invention is not limited thereto. For example, the suction unit 100 may move from the first position to the third position even on a carpeted surface to be cleaned, a repetitively curved surface, or a surface with an obstacle.

In addition, since the support unit 140 keeps the gap constant between the surface to be cleaned and the suction portion 120, the brush 154 of the brush unit 150 may keep contacting the surface to be cleaned.

Next, the brush unit 150 will be described.

FIG. 9 is a perspective view of a brush unit according to an embodiment of the present invention.

As described above, the brush unit 150 may include the rotating drum 152 and the brush 154.

The brush 154 may include a converging portion 155 and at least one blade portion 156 extending from the converging portion 155 toward the end of the rotating drum 152 along the direction of rotation. In detail, the at least one blade portion 156 may be formed to have a shape that is branched along the rotating direction of the rotating drum 152 about the converging portion 155.

The at least one blade portion 156 may include a first blade 156a and a second blade 156b that are branched from the converging portion 155 toward either end of the rotating drum 152. The first blade 156a and the second blade 156b may spirally extend from the converging portion 155 along the rotational direction of the brush unit 150.

One converging portion 155 may be formed between a pair of blades, so that foreign matter on the surface to be cleaned is converged toward the converging portion 155 by the rotation of the brush unit 150. With this configuration, foreign matter may be easily picked up by the blade portions 156 and the converging portion 155. In this connection, a case where the brush unit 150 is flattened as in FIG. 10 will now be described for convenience of explanation. In this case, the brush 154 is formed to have a V shape, and a pair of blades centered on the converging portion 155 is shaped to be branched toward either end of the rotating drum 152. However, the shape of the brush 154 is not limited thereto, but it may also be formed to have a W shape, or a plurality of blades may be branched around the converging portion 155.

At least one blade portion 156 may be provided at regular intervals along the circumference of the rotating drum 152. In this embodiment, three blade portions 156 are disposed at regular intervals, but the number and arrangement of the blade portions 156 are not limited.

Hereinafter, a suction guide will be described.

FIGS. 11 and 12 are diagrams illustrating opening and closing operations of an opening or closing unit according to an embodiment of the present invention. FIG. 13 is a bottom perspective view of an opening or closing unit according to an embodiment of the present invention. FIGS. 14 and 15 are enlarged views of an operation of an opening or closing unit according to an embodiment of the present invention.

The robotic cleaner 1 may include a suction guide portion 170 provided on the front surface in the traveling direction.

The suction guide portion 170 is placed on the front of the robotic cleaner 1 in the traveling direction for guiding foreign material in the path of the moving robotic cleaner 1 to the suction portion 120.

The suction guide portion 170 may include a suction guide surface 172, an opening 174, and an opening or closing unit 176.

The suction guide surface 172 may be formed at an angle to the running direction of the robotic cleaner 1. The opening 174 may be formed at the end of the suction guide surface 172. In detail, at least one suction guide surface 172 is formed, and the opening 174 may be formed at the end of the suction guide surface 172 for the foreign matter guided by the at least one suction guide surface 172 to be moved to the suction portion 120. Corresponding to at least one suction guide surface 172, at least one opening 174 may also be provided. The suction guide surface 172 may guide relatively large foreign matter to easily come into the suction portion 120.

In this embodiment, a pair of suction guide surfaces 172 are formed on both sides of one opening 174. The pair of suction guide surfaces 172 are formed to be inclined toward the opening 174 so that the foreign substance from the surface to be cleaned is guided to the opening 174 by the pair of suction guide surfaces 172 during the robotic cleaner 1 is moving around. However, the number and arrangement of the suction guide surfaces 172 and the opening 174 are not limited thereto.

An opening or closing unit 176 is provided to open and close the opening 174. The opening or closing unit 176 may operate to open and close the opening 174 by a unit operation portion 180. The opening or closing unit 176 is provided to have a shape corresponding to the shape of the opening 174. Foreign objects guided by the suction guide surface 172 do not pass through the opening 174 but accumulate in front of the opening or closing unit 176 when the opening or closing unit 176 is located in the closed position P1. Conversely, when the opening or closing unit 176 is at the opened position P2, the foreign substances guided by the suction guide surface 172 pass through the opening 174 and are sucked into the suction portion 120.

With the operation of opening or closing the opening 174 by the opening or closing unit 176, the inflow of the foreign matter guided by the suction guide surface 172 as described above into the suction portion 120 may be regulated. Also, the opening or closing unit 176 may be operated even to increase the suction force of the suction portion 120.

When the robotic cleaner 1 passes an area where the bottom surface and the surface to be cleaned are identical, the suction force at the suction portion 120 is not significantly affected even if the opening 174 is opened. However, if the robotic cleaner 1 passes an area, such as a carpeted area, where the bottom surface and the surface to be cleaned are spaced apart, the suction force at the suction portion 120, when the opening 174 is opened, is noticeably reduced due to air suction through the opening 174. In this case, the opening 174 is closed by the opening or closing unit 176 to increase the suction forceby limiting the area to be cleaned to the surface to be cleaned that faces the inlet 122 of the suction portion 120.

The unit operation portion 180 is connected to the opening or closing unit 176 to enable the opening or closing unit 176 to be opened and closed. The unit operation portion 180 may include a unit drive part 182, a drive gear 184, and a link member 186. The unit drive part 182 is provided to generate power to drivet the opening or closing unit 176. The unit drive part 182 may include, for example, a motor. The drive gear 184 is connected to the unit drive part 182 and is arranged to be rotated by the power generated from the unit drive part 182. The link member 186 has one end rotatably connected to the drive gear 184 and the other end rotatably connected to the opening or closing unit 176.

The drive gear 184 rotates in either a forward or reverse direction, and the rotational force from the drive gear 184 is transferred to the opening or closing unit 176 by the link member 186 so that the opening or closing unit 176 is moved to the opened position (P2) or closed position (P1).

In detail, the opening or closing unit 176 may include a unit connecting part 177 to which the other end of the link member 186 is connected, a unit rotating shaft 178 around which the opening or closing unit 176 is rotated, and a unit body 179 located opposite the unit connecting part 177 about the shaft 178. The unit body 179 may be formed in the shape of a plate corresponding to the shape of the opening 174. When the drive gear 184 rotates in the first direction, the opening or closing unit 176 is rotated about the unit rotating shaft 178 by a link member 186 connected to the unit connecting part 177, and moves from the opened position (P2) to the closed position (P1). Conversely, when the drive gear 184 rotates in the second direction, the opening or closing unit 176 is rotated about the unit rotating shaft 178 by a link member 186 connected to the unit connecting part 177, and moves from the closed position (P1) to the opened position (P2). The operation and configuration of the unit operation portion 180 is not limited thereto and it is satisfactory to have the opening or closing unit 176 configured to operate the opening or closing unit 176 to open and close the opening 174.

Hereinafter, an operation method of the opening or closing unit 176 will be described.

In one embodiment of the method of operating the opening or closing unit 176, the opening or closing unit 176 may be provided to go back and forth between the opened position (P2) and the closed position (P1) with regular time intervals. This operation may be performed by controlling the unit drive part 182, or by mechanically connecting the drive gear 184, link member 186, and unit connecting part 177 in a crank structure, the opening or closing unit 176 may be repeatedly moved between the opened position (P2) and the closed position (P1).

In another embodiment of the operating method of the opening or closing unit 176 will be described. A sensor unit detects a condition of the surface to be cleaned, detects a surrounding terrain, and detects an obstacle. If the measured value satisfies a predetermined condition, the opening or closing unit 176 closes or opens the opening 174.

As an example of this embodiment, if the robotic cleaner 1 is traveling on a carpet, the sensor unit senses the carpet and controls the unit drive part 182 to move the opening or closing unit 176 to the closed position (P1) to increase the suction force at the suction portion 120. As another example, if the sensor unit senses scattering of relatively large foreign objects on the traveling path, it may control the unit drive part 182 to move the opening or closing unit 176 to the opened position (P2) so that the foreign objects may be easily sucked at the suction portion 120.

The opened position P2 of the opening or closing unit 176 is not limited, but is arranged to be moved in an opposite direction to the direction of movement of the robotic cleaner 1 with respect to the closed position P1. In other words, while the robotic cleaner 1 is moving forward, the unit body 179 of the opening or closing unit 176 is configured to open the opening 174 by turning backward from the closed position P1. With this configuration, the opening or closing unit 176 may be operated in a direction not to be disturbed by the robotic cleaner 1.

Hereinafter, another embodiment of the present invention will be described.

Description of configurations overlapping with the above-described embodiment will be omitted.

FIG. 16 is a side view of a suction unit according to another embodiment of the present invention.

The suction unit 100 may include at least one support unit 140*a*.

The support unit 140*a* is provided to separate the inlet 122 and the surface to be cleaned by the predetermined distance h. When the inlet 122 and the surface to be cleaned are in contact with each other, it makes it difficult for outside air and foreign matter to flow into the suction unit 100 through the inlet 122. Accordingly, in order to prevent lowering of the suction efficiency due to contact between the inlet 122 and the surface to be cleaned, the support unit 140*a* supports the suction portion 120 so that the inlet 122 is spaced apart from the surface to be cleaned by the predetermined distance h.

The support unit 140*a* includes a plurality of rollers 141*a*, and a moving belt 142*a* disposed to surround the plurality of rollers 141*a* and rotated along with the plurality of rollers 141*a*. The moving belt 142*a* is arranged to be in contact with the surface to be cleaned and may support the suction unit 100 together with the plurality of rollers 141*a*. With this configuration, the suction unit 100 may be provided to move along the moving direction of the robotic cleaner 1.

The support unit 140*a* is rotatably disposed at a lower portion of the suction unit 100 to support the suction unit 100 against the surface to be cleaned while spacing the inlet 122 of the suction portion 120 from the surface to be cleaned by a predetermined distance h.

Hereinafter, another embodiment of the present invention will be described.

Description of configurations overlapping with the above-described embodiment will be omitted.

FIG. 17 is a side view of a suction unit according to another embodiment of the present invention.

The suction unit 100 may include at least one support unit 140b.

The support unit 140b is provided to separate the inlet 122 and the surface to be cleaned by the predetermined distance h. When the inlet 122 and the surface to be cleaned are in contact with each other, it makes it difficult for outside air and foreign matter to flow into the suction unit 100 through the inlet 122. Accordingly, in order to prevent lowering of the suction efficiency due to contact between the inlet 122 and the surface to be cleaned, the support unit 140b supports the suction portion 120 so that the inlet 122 is spaced apart from the surface to be cleaned by the predetermined distance h.

The support unit 140b may include a supporting surface 141b contacting the surface to be cleaned and a bending supporting surface 142b bending upward from the supporting surface 141b.

The supporting surface 141b is arranged to be in contact with the surface to be cleaned so that the suction unit 100 is supported against the surface to be cleaned while the inlet 122 and the surface to be cleaned are spaced apart from each other by the predetermined distance h. During moving of the robotic cleaner 1, the supporting surface 141b may slide on the surface to be cleaned.

The bending supporting surface 142b may be formed to be bent from the supporting surface 141b. The bending supporting surface 142b is formed to be inclined upward toward the front from the supporting surface 141b to be able to easily pass by obstacles in the movement path of the robotic cleaner 1. For example, if there is an obstacle such as a step in the movement path of the robotic cleaner 1, the suction unit 100 moves upward along the bending supporting surface 142b, thereby preventing the support unit 140 from being stuck by an obstacle and disturbing the movement of the robotic cleaner.

Hereinafter, another embodiment of the present invention will be described.

Description of configurations overlapping with the above-described embodiment will be omitted.

FIGS. 18 and 19 are cross-sectional views of a suction unit according to another embodiment of the present invention.

The suction unit 100 may include a control unit 190. When the robotic cleaner 1 encounters obstacles such as a threshold on the surface to be cleaned while moving around, the control unit 190 is configured to forcibly move the suction unit 100 upward to avoid the obstacles. The control unit 190 may include a control frame 192 and a control cam 194.

The control frame 192 may be formed on the upper portion of the suction unit body 110. The control frame 192 may be height-controlled by the control cap 194 as will be described later, to be able to limit the room for the suction unit 100 to be movable in the moving space 14.

The control cam 194 may be configured to adjust the position of the control frame 192. The control cam 194 may be connected to the cleaner body 10 to be rotatable about a cam rotating shaft 195. The outer circumferential surface of the control cam 194 is formed to have a different radius from the cam rotating shaft 195 depending on the rotation angle. The control frame 192 is disposed to be in contact with the outer circumferential surface of the control cam 194 and configured to be moved up and down with the rotation of the control cam 194.

A portion of the outer circumferential surface farthest from the cam rotating shaft 195 of the control cam 194 is defined as a first contact surface 194a. A portion of the outer circumferential surface having the shortest distance from the cam rotating shaft 195 of the control cam 194 is defined as a second contact surface 194b. The contact surface between the first contact surface 194a and the second contact surface 194b is defined as the third contact surface 194c.

The second contact surface 194b of the control cam 194 is formed to support the control frame 192 while the robotic cleaner 1 is moving around to clean the surface to be cleaned. In this case, the distance between the control frame 192 and the top of the unit moving part 16 is D1. That is, the suction unit 100 may be moved a distance of D1 up and down.

When the first contact surface of the control cam 194 is configured to support the control frame 192, the distance between the control frame 192 and the top of the unit moving part 16 is D2 less than D1. That is, the suction unit 100 may be moved the distance D2 up and down. That is, the movable space of the suction unit 100 is reduced compared with the case where the second contact surface 194b of the control cam 194 contacts the control frame 192.

With this configuration, if the robotic cleaner 1 passes an obstacle such as a step while moving around, the suction unit 100 may be forcibly moved upward to avoid the obstacle.

Hereinafter, another embodiment of the present invention will be described.

Description of configurations overlapping with the above-described embodiment will be omitted.

FIG. 20 is a bottom perspective view of an opening or closing unit according to another embodiment of the present invention. FIGS. 21 and 22 are enlarged views of an operation of an opening or closing unit according to another embodiment of the present invention.

The robotic cleaner 1 may include a suction guide portion 270 provided on the front side in the traveling direction.

The suction guide portion 270 provided on the front side of the robotic cleaner 1 in the traveling direction is configured to guide a foreign material in a moving path of the robotic cleaner 1 to the suction portion 120.

The suction guide portion 270 may include a suction guide surface 272, an opening 174, and a sliding shutter 276.

A sliding shutter 276 is provided to open and close the opening 174. The sliding shutter 276 is operable to open and close the opening 174 by a sliding shutter operating part 280. Foreign substances guided by the suction guide surface 172 do not pass through the opening 174 but accumulate in front of the sliding shutter 276 when the sliding shutter 276 is located in the closed position P1. In contrast, when the sliding shutter 276 is positioned in the opened position P2, the foreign substances guided by the suction guide surface 172 are sucked into the suction portion 120 through the opening 174.

With the operation of the sliding shutter 276 to open and close the opening 174, the inflow of the foreign matter guided by the suction guide surface 172 as described above into the suction portion 120 is regulated. Also, the sliding shutter 276 may be operated even to increase suction force of the suction portion 120.

When the robotic cleaner 1 passes an area to be cleaned where the bottom surface and the surface to be cleaned are identical, the suction force at the suction portion 120 is not significantly affected even if the opening 174 is opened. However, if the robotic cleaner 1 passes an area, such as a carpeted area, where the bottom surface and the surface to be cleaned are spaced apart, the suction force at the suction portion 120 when the opening 174 is opened is noticeably reduced due to air suction through the opening 174. In this case, the opening 174 is closed by the sliding shutter 276 to limit the area to be cleaned to a surface facing the inlet 122 of the suction portion 120, thereby increasing the suction force.

The sliding shutter 276 may include a sliding shutter body 277, and a sliding shutter opening 278 provided on the sliding shutter body 277 to correspond to the opening 174. The sliding shutter body 277 is formed to be adjacent to the opening 174 and may be slidingly moved. In this embodiment, it may slide in the lateral direction across the inner surface of the unit moving part 16 adjacent to the opening 174. The sliding shutter may be moved between the opened position P2 where the opening 174 of the suction guide portion 170 corresponds to the sliding shutter opening 278 and the closed position P1 where the opening 174 of the suction guide portion 170 corresponds to the sliding shutter body 277.

The sliding shutter operating part 280 is connected to the sliding shutter 276 to open and close the sliding shutter 276. The sliding shutter operating part 280 may include a sliding shutter driving part 282, a rack gear 286, and a worm gear 284. The rack gear 286 may be combined with the sliding shutter 276 to be integrated with the sliding shutter 276. The worm gear 284 is coupled to the sliding shutter driving part 282 to be rotated by the power generated by the sliding shutter driving part 282. The rack gear 286 is adapted to go back and forth with the rotation of the worm gear 284, making the sliding shutter 276 movable between the closed position P1 and the opened position P2.

The operation and configuration of the sliding shutter operating part 280 are not limited thereto and it is satisfactory to have the sliding shutter 276 configured to operate the sliding shutter 276 to open and close the opening 174. [

Hereinafter, an operation method of the sliding shutter 276 will be described. The sliding shutter 276 may be provided to go back and forth between the opened position P2 and the closed position P1 with predetermined time intervals. This operation may be performed by controlling the sliding shutter operating part 280, or the sliding shutter 276 may be mechanically arranged to repeatedly move between the opened position P2 and the closed position P1.

Also, a sensor unit may detect a condition of the surface to be cleaned, detect a surrounding terrain, detect an obstacle, and the like, and if the predetermined condition is satisfied, the sliding shutter 276 may close or open the opening 174.

For example, if the robotic cleaner 1 is traveling on a carpet, the sensor unit may sense the carpet and control the sliding shutter operating part 280 to move the sliding shutter 276 to the closed position P1, thereby increasing the suction force at the suction portion. In another example, the sensor unit may detect scattering of relatively large foreign objects in the traveling path, and may control the sliding shutter operating part 280 to move the sliding shutter 276 to the opened position (P2), thereby facilitating smooth suction of the foreign objects in the suction portion 120.

Hereinafter, another embodiment of the present invention will be described.

Description of configurations overlapping with the above-described embodiment will be omitted.

A robotic cleaner having a different opening or closing unit 176a from the opening or closing unit 176 in the previous embodiment will be described.

FIG. 23 is a view of an opening or closing unit according to another embodiment of the present invention. The opening or closing unit 176a includes a unit connecting part 177a connected to the link member 186, a unit rotating shaft 178a provided to rotate the opening or closing unit 176a, and a unit body 179a positioned opposite the unit connecting part 177a.

The unit body 179a may be formed to have a cross-sectional shape corresponding to the opening 174 with respect to the rotational direction. Further, the unit body 179a may be formed to extend a certain angle about the unit rotating shaft 178a.

The unit operation portion 180 is connected to the opening or closing unit 176a to open and close the opening or closing unit 176a. The unit operation portion 180 may include a unit drive part 182, a drive gear 184, and a link member 186. When the drive gear 184 rotates in the first direction, the opening or closing unit 176a is rotated about the unit rotating shaft 178a by a link member 186 connected to the unit connecting part 177a. The opening or closing unit (176a) moves from the opened position P2 to the closed position P1. Conversely, when the drive gear 184 rotates in the second direction, the opening or closing unit 176a is rotated about the unit rotating shaft 178a by a link member 186 connected to the unit connecting part 177a. The opening or closing unit 176a is moved from the closed position P1 to the opened position P2. As described above, the unit drive part 182 may rotate forward or reverse to open the opening or closing unit 176a.

In another configuration of the unit operation portion 180, the unit operation portion 180 may be configured for the opening or closing unit 176a to be rotated about the unit rotating shaft 178a. The unit operation portion 180 and the unit connecting part 177a are connected together as in a crank structure, so that the unit body 179a closes the opening 174 when the rotation of the opening or closing unit 176a is within a certain angle range. Also, if the rotation of the opening or closing unit 176a is performed within the other range than the certain angle range, the unit body 179a may open the opening 174.

Hereinafter, another embodiment of the present invention will be described.

Description of configurations overlapping with the above-described embodiment will be omitted. A robotic cleaner having a different example of opening or closing unit 176b than the opening or closing unit 176 in the previous embodiment will be described.

FIG. 24 is a view of an opening or closing unit according to another embodiment of the present invention;

The opening or closing unit 176b includes a unit connecting part 177b connected to the link member 186, a unit rotating shaft 178b provided to rotate the opening or closing unit 176b, and a unit body 179b positioned opposite the unit connecting part 177b.

The unit body 179b may be formed such that its cross-section with respect to the direction of the unit rotating shaft 178b has the shape of rotary wings. In this embodiment, the unit body 179b may include a first opening or closing unit wing 179ba, and a second opening or closing unit wing 179bb. The unit operation portion 180 may be configured such that the opening or closing unit 176b rotates about the unit rotating shaft 178b. With the configuration, the opening 174 may be repeatedly opened or closed by the first opening or closing unit wing 179*ba* and the second opening or closing unit wing 179*bb*.

Hereinafter, another embodiment of the present invention will be described.

Description of configurations overlapping with the above-described embodiment will be omitted.

FIG. 25 is a view of a brush unit according to another embodiment of the present invention.

The suction unit 100 may include a brush unit 250.

The brush unit 250 is rotatably provided inside the suction unit 100 for picking up foreign substances from the surface to be cleaned into the suction unit 100. The brush unit 250 rotates around a rotation axis and may be rotated inside the suction unit body 110.

The brush unit 250 includes a rotating drum 152 rotating around a rotating shaft, and a brush 254 formed on the outer circumferential surface of the rotating drum 152. The brush unit 250 is driven by a brush motor 160. End caps 158 are provided at both ends of the rotating drum 152 to prevent foreign matter from moving to the brush motor 160. The brush 254 may be formed of an elastic material and the brush 254 may be driven along with the rotating drum 152 while the robotic cleaner 1 travels to scatter or suck dust or foreign matter present on the surface to be cleaned.

In the embodiments of FIGS. 5 to 8, the configuration in which the end of the brush 254 contacts the surface to be cleaned has been described. However, in this embodiment, the brush 254 has a different shape.

The brush 254 may be formed of an elastic material to be rotated sweeping the surface to be cleaned while being bent and deformed when contacting the surface to be cleaned.

In detail, the brush 254 may include a bending portion 257 that may be bent when coming into close contact with the surface to be cleaned to sweep the surface to be cleaned while being rotated. The bending portion 257 may be formed in at least some of the converging portion 255 of the brush 254 and at least one blade portion 256. In other words, the entire area of the brush 254 may be formed as the bending portion, or the bending portion may be formed only in the converging portion 255 and the blade portion 256 adjacent to the converging portion 255. Thus, the region for the bending portion in the brush 254 is not limited.

While the specific embodiment of the present invention has been illustrated and described above in detail, the invention is not limited by the embodiment and may be variously modified and changed by those skilled in the art without departing from the scope of the invention as defined by the following claims.

The invention claimed is:

1. A robotic cleaner comprising:
  a cleaner body arranged to be movable; and
  a suction unit arranged to move relative to the cleaner body in a vertical direction by a plurality of elastic unit members,
  wherein the suction unit includes:
    a brush unit arranged to be rotated about a rotation axis within the suction unit;
    an inlet, through which foreign matter on a cleaning surface is sucked; and
    at least one support unit including a plurality of rollers provided to separate the inlet and the cleaning surface from each other by a predetermined distance, and
  wherein all of the plurality of elastic unit members are arranged on one side of the inlet in a horizontal direction.

2. The robotic cleaner according to claim 1, wherein the suction unit is configured to move relative to the surface to be cleaned according to a condition of the surface to be cleaned.

3. The robotic cleaner according to claim 1, wherein the suction unit comprises a suction unit body, and a suction portion for forming the inlet under the suction unit body,
  wherein the at least one support unit supports the suction unit body such that the suction portion is positioned higher than the surface to be cleaned.

4. The robotic cleaner according to claim 3, wherein the at least one support unit is rotatably provided at the bottom of the suction unit body to support the suction unit body against the surface to be cleaned.

5. The robotic cleaner according to claim 3, wherein the at least one support unit further includes a moving belt configured to surround the plurality of rollers and configured to be rotated with the plurality of rollers in contact with the surface to be cleaned.

6. The robotic cleaner according to claim 3, wherein the at least one support unit includes:
  a supporting surface contacting with the surface to be cleaned; and
  a bending supporting surface bent obliquely upward from the supporting surface.

7. The robotic cleaner according to claim 1, wherein the at least one support unit is disposed around the inlet.

8. The robotic cleaner according to claim 1, wherein the suction unit includes:
  a suction unit body; and
  a suction portion forming the inlet under the suction unit body,
  wherein the brush unit is formed to have a rotation radius larger than a gap between the rotation axis and the suction portion.

9. The robotic cleaner according to claim 8, wherein the brush unit includes:
  a bending portion which is at least part of the brush unit formed to be bendable to sweep the surface to be cleaned.

10. The robotic cleaner according to claim 8, wherein the brush unit includes:
  a rotating drum rotating about the rotation axis; and
  a brush formed on an outer circumferential surface of the rotating drum,
  wherein the brush includes:
    a converging portion; and
    at least one blade portion formed from the converging portion toward the end of the rotating drum along a direction of rotation.

11. The robotic cleaner according to claim 10, wherein the at least one blade portion includes:
  a first blade and a second blade, which are branched from the converging portion toward either end of the rotating drum,
  wherein the first blade and the second blade are arranged spirally along the direction of rotation of the brush unit from the converging portion.

12. The robotic cleaner according to claim 10, wherein the at least one blade portion has a V-shape around the converging portion.

13. The robotic cleaner according to claim 10, wherein the at least one blade portion includes a plurality of blade portions spaced apart at regular intervals along an outer circumferential surface of the rotating drum.

14. The robotic cleaner according to claim 1, wherein the cleaner body includes:

a moving space, in which the suction unit is arranged to move relative to the cleaner body in a vertical direction, and wherein the suction unit includes:
  a suction unit body disposed in the moving space; and
  at least one elastic unit member of the plurality of elastic members has one end connected to the suction unit body and the other end connected to the cleaner body for the suction unit body to be moved inside the moving space.

15. A robotic cleaner comprising:

a cleaner body arranged to be movable; and a suction unit arranged to move relative to the cleaner body in a vertical direction, wherein the cleaner body includes:
  a moving space, in which the suction unit is arranged to move relative to the cleaner body in a vertical direction, and wherein the suction unit includes:
  an inlet, through which foreign matter on a cleaning surface is sucked,
  at least one support unit provided to separate the inlet and the cleaning surface from each other by a predetermined distance,
  a suction unit body disposed in the moving space,
  an elastic unit member having one end connected to the suction unit body and the other end connected to the cleaner body for the suction unit body to be moved inside the moving space,
  a control frame provided on the suction unit body, and
  a control cam for adjusting a height of the suction unit relative to the cleaner body to limit a movement range of the suction unit within the moving space, and contacting the control frame to change the position of the control frame according to a rotation angle.

* * * * *